US008396489B2

(12) United States Patent
Platt et al.

(10) Patent No.: US 8,396,489 B2
(45) Date of Patent: Mar. 12, 2013

(54) METHOD AND SYSTEM FOR TRANSMITTING AND RECEIVING MESSAGES

(75) Inventors: Tim Platt, Henniker, NH (US); Kevin D. King, New Boston, NH (US); Stephan H. Krueger, Salem, NH (US)

(73) Assignee: Pokos Communications Corp, Portsmouth, NH (US)

( * ) Notice: Subject to any disclaimer, the term of this patent is extended or adjusted under 35 U.S.C. 154(b) by 213 days.

(21) Appl. No.: 12/972,336

(22) Filed: Dec. 17, 2010

(65) Prior Publication Data

US 2011/0151890 A1 Jun. 23, 2011

Related U.S. Application Data

(60) Provisional application No. 61/287,330, filed on Dec. 17, 2009, provisional application No. 61/408,021, filed on Oct. 29, 2010.

(51) Int. Cl.
*H04W 4/02* (2009.01)
(52) U.S. Cl. .................. 455/456.2; 455/457; 455/414.2; 455/456.3; 455/458; 455/456.1
(58) Field of Classification Search ............... 455/456.1, 455/456.6, 456.3, 457, 414.2, 458
See application file for complete search history.

(56) References Cited

U.S. PATENT DOCUMENTS

| | | | |
|---|---|---|---|
| 7,668,832 B2 | 2/2010 | Yeh et al. | |
| 7,693,752 B2 | 4/2010 | Jaramillo | |
| 7,848,765 B2 | 12/2010 | Phillips et al. | |
| 2005/0250552 A1 | 11/2005 | Eagle et al. | |
| 2007/0099701 A1 | 5/2007 | Simon et al. | |
| 2009/0082038 A1* | 3/2009 | McKiou et al. | 455/456.6 |
| 2009/0233629 A1* | 9/2009 | Jayanthi | 455/457 |
| 2010/0070758 A1 | 3/2010 | Low et al. | |
| 2010/0293029 A1* | 11/2010 | Olliphant | 705/9 |
| 2011/0119133 A1* | 5/2011 | Igelman et al. | 705/14.58 |

FOREIGN PATENT DOCUMENTS

| | | |
|---|---|---|
| KR | 10-2002-0095449 | 12/2002 |
| KR | 10-2009-0103959 | 10/2009 |

OTHER PUBLICATIONS

International Search Report issued for PCT/US2010/061144, dated Aug. 31, 2011 (2 pages).
"Google Secures Broad Patent for Location-Based Advertising," Pokos Blog, 2010 (1 page).
"iGroups: Apple's New iPhone Social App in Development"; www.patentlyapple.com Retrieved Aug. 3, 2011 (8 pages).
Biggs, J. "ChatSquare: Chat With Your FourSquare Friends Live," http://techcrunch.com Retrieved Aug. 3, 2011 (3 pages).
Eagle, N. and Pentland, A., "Social Serendipity: Mobilizing Social Software," Pervasive Computing, pp. 28-34 (Apr.-Jun. 2005).
Heinemann, D., "Collaboration in Opportunistic Networks", Ph.D. Thesis, TU Darmstadt. (2007) (174 pages).
Hodgkins, K. "Apple submits patent application for magnetic and sound-based peer-to-peer technology," RSS Feed, Pokos Blog, Apr. 21, 2011 (1 page).
Miklas, A. et al., "Exploiting Social Interactions in Mobile Systems", *UbiComp 2007: Ubiquitous Computing*, Springer-Verlag Lecture Notes in Computer Science 4717, 409-428 (2007).

(Continued)

*Primary Examiner* — David Q Nguyen

(57) ABSTRACT

Systems, methods, and apparatus are provided to enable real-time communication with people, groups and devices in accordance with certain embodiments. Typically, a phone number, address, or login information ("traditional identification information") is needed to initiate a communication with a specific person. However, there are many situations where this traditional identification information is not known, but individuals still wish to communicate with others whose traditional identification information they do not know. By selecting criteria such as geographical location information that is proximate to the device, a person can identify and communicate with others while not knowing their contact information. The criteria can also include attributes, visual information, or other characteristics of the target device.

20 Claims, 18 Drawing Sheets

OTHER PUBLICATIONS

Moore, G. "Where Inc. secures new mobile tech patent," Pokos Blog, 2010 (2 pages).

Pattison, K., "Geolocation Services: Find a Smartphone, Find a Customer," The New York Times, Oct. 6, 2010 (4 pages).

* cited by examiner

METHOD AND SYSTEM FOR TRANSMITTING AND RECEIVING MESSAGES

CROSS-REFERENCE TO RELATED APPLICATIONS

This application claims benefit under 35 U.S.C. §119(e) of U.S. Provisional Patent Application No. 61/287,330, entitled "Communication Methods between, among and to Unknown Wireless and other Devices, and Marketing and Sales Methods to and from Wireless and other Devices," filed Dec. 17, 2009, and U.S. Provisional Patent Application No. 61/408,021, entitled "Method and System for Transmitting and Receiving Messages," filed Oct. 29, 2010, each of which are hereby incorporated by reference herein in its entirety.

FIELD OF THE DISCLOSURE

This disclosure relates generally to a system and method for transmitting and receiving messages among mobile and other devices in a communication network.

BACKGROUND

Wireless networks are telecommunications networks that use radio waves to carry information between nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. The wireless networks allow mobile devices to move and change locations, while maintaining a connection with the network. This connection allows information to be sent and received with the mobile devices communicating with the wireless network.

These traditional voice telephony and more recent electronic private communications methods have shared a common limiting characteristic: their effectiveness has been limited to communication between known parties or among known, fixed endpoints. That is, a person that wants to communicate with another needs to know information such as a telephone number, email address, or other information in order to initiate communication with that person. Internet bulletin boards, chat rooms, blogs and micro-blogs have enabled a broader reach through more public postings, but lack the capability to direct private communications to certain individuals or groups, such as (i) observed but unknown people; (ii) people at a designated location or locale; and (iii) groups of unknown people with identified attributes.

These historic communications methods and more recent Internet-based and GPS-based applications are based on the premise that directed private communications are only possible or feasible between, among and to known fixed endpoints. Social networking and other recent interactive media are also limited by their inability to provide a means in real-time to bring such people together in person.

SUMMARY

A first embodiment provides people with the ability to communicate with people they do not know through enabling the real-time, directed and targeted delivery of messages and other communications beyond known fixed endpoints, and thus overcomes the limitations of current communications methods. An example of this embodiment for use in wireless and other devices is where a participant wants to direct in real-time a targeted message to another person whom s/he can see but does not know; to a group of people (again whom s/he does not know) in a certain specific locale or within a specified geographic range or distance; or to a group of people (also whom s/he does not know) with common attributes.

A second disclosed embodiment relates to creating and providing people with the ability to direct targeted marketing and sales programs, processes and techniques to known and unknown people through enabling the delivery, exchange, tracking and analysis of messages, promotions and other communications beyond known fixed endpoints, and thus overcomes the foregoing limitations of current methods used to market to and via wireless, mobile and other devices.

A third embodiment relates to creating and providing the users of wireless, mobile and other devices with the ability to redeem promotions and makes purchases using such devices, and thus overcomes the foregoing limitations of current methods used to offer promotions to and procure sales from wireless and other devices.

In some embodiments a method of selectively communicating with one or more other devices whose identification information is unknown is disclosed, the method comprising launching a client application on a device, wherein the client application enables communication with other devices whose identification information is unknown, locating other devices in a defined geographical zone proximate to the device using the client application; obtaining information regarding the other devices located in the defined geographical zone; compiling the information regarding the other devices located in the defined geographical zone to enable selection of at least one device to initiate communication using service messages; displaying a selection of the at least one device from the compiled information of the other devices located in the defined geographical zone; enabling privacy preferences for the device, wherein the privacy preferences enable the device to provide variable identification information to the at least one other device; enabling the client application on the device to specify whether a service message is a private service message, wherein the private service message is sent only to the at least one other device; and sending the service message from the device to the at least one other device.

In some embodiments a method of selectively communicating with one or more other devices whose identification information is unknown is disclosed, the method comprising launching a client application on a device, wherein the client application enables communication with other devices whose identification information is unknown; identifying other devices based on selected criteria specified in the client application; receiving information regarding the other devices possessing the selected criteria; compiling the information regarding the other devices possessing the selected criteria; displaying a selection from the compiled information of at least one other device possessing the selected criteria; enabling privacy preferences for the device, wherein the privacy preferences enable the device to provide variable identification information to the at least one other device; enabling the client application on the device to specify whether a message is a private message, wherein the private message is sent only to the selected at least one other device; and sending the message from the device to the selected at least one other device.

In some embodiments a device for selectively communicating with one or more other devices whose identification information is unknown, the device comprising an interface that is configured to communicate with the one or more other devices and a client application that is configured to communicate with the interface to search for at least one of the one or more other devices based on selected criteria specified in the client application and to compile information obtained from the one or more other devices, the client application further configured to send a message to one or more other devices selected from the compiled information, and to enable privacy preferences for the device, wherein the privacy preferences enable the device to provide variable identification information to the at least one other device as well as to enable the client application to specify whether a message is a private message, wherein the private message is sent only to the selected at least one other device.

In some embodiments a method of selectively communicating between devices when identification information used to contact a device is unknown, the method comprising receiving, at a remote processing server, registration information from a first device; creating user identification information for the first device and associating the user identification information with the registration information; determining criteria for the first device and associating the criteria in the database with the user identification information of the first device; receiving, at the remote processing server, a second registration from at least one other device; organizing information from the first device and the at least one other device in a database on the remote processing server; determining criteria for the at least one other device and storing in the database; receiving a service message, at the remote processing server, from the first device, wherein the service message comprises content and user identification information; searching the database using the criteria selected by the first device to locate at least one other device that is within parameters specified by the first device; obtaining information for the at least one other device and processing the service message to send to the at least one other device; and sending a processed service message including the content of the service message to the at least one other device.

DETAILED DESCRIPTION

Systems, methods, and apparatus are provided to enable real-time communication with people, groups and devices in accordance with certain embodiments. Typically, a phone number, address, or login information ("traditional identification information") is needed to initiate a communication with a specific person. For example, to call a person you dial a phone number; to text a person you need their mobile phone number; to send an instant message, you need their email address, or a specific screen name or alias registered with the maker of an instant messaging application (e.g., Google Talk; AOL AIM); to email a person you need an email address; and for web-based social sites or applications. You need to know a user's name or login information to communicate with them. However, there are many situations where this traditional identification information is not known, but individuals still wish to communicate with others whose traditional identification information they do not know. For example, at a conference a person may want to communicate with or meet others at the conference, but does not know other peoples' phone numbers or emails. Another instance could be at an event such as a concert, sporting venue, or some charity function where a person wants to communicate with one or more persons at the event. In order to provide this type of communication among and with people, groups, and devices whose traditional identification information is unknown, various systems, methods, and apparatus are disclosed.

Figure 1:
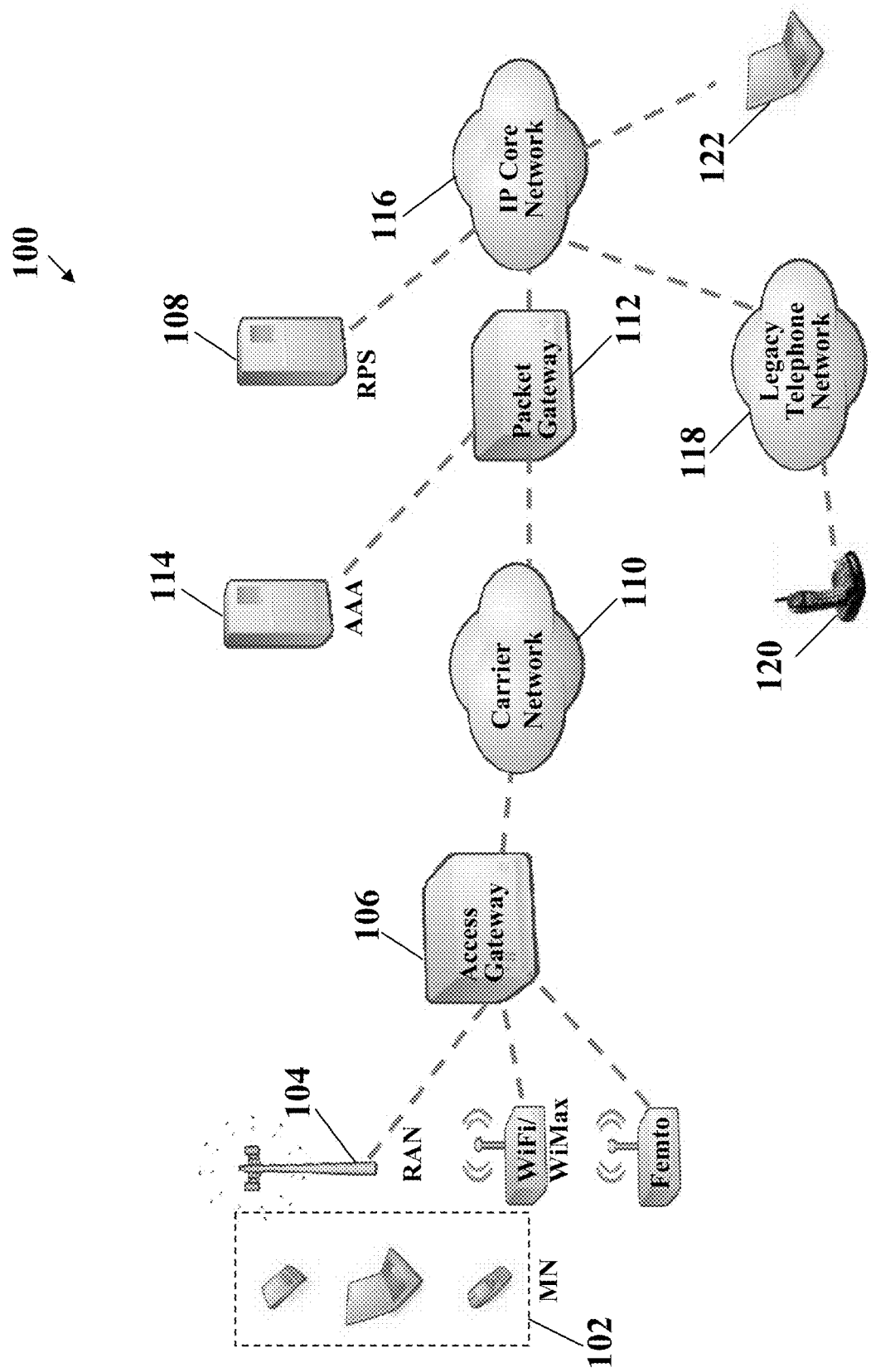
FIG. 1 illustrates a communication network that provides communication to recipients whose traditional identification information is unknown in accordance with certain embodiments.

FIG. 1 illustrates a communication network that provides communication to recipients whose traditional identification information is unknown in accordance with certain embodiments. The communication network 100 of FIG. 1 includes a mobile node (MN) 102, a transceiver 104, an access gateway 106, a remote processing server (RPS) 108, a carrier network 110, a packet gateway 112, an accounting, authentication, and authorization (AAA) server 114, an IP core network 116, a legacy telephone network 118, a landline phone 120, and an Internet connected device 122. The mobile node can be any type of wireless device such as a mobile phone, smart phone, notebook, netbook, tablet computer, or other wireless communication device. The mobile node provides a user with applications and communicates with other people and devices using the communication network 100. The mobile node 102 can be configured with Global Positioning System ("GPS") capabilities to receive geocode information from GPS satellites. The GPS capability can be implemented using a locational software application based on the Global Positioning System ("GPS"). The mobile node can further include a digital compass that provides the user direction information based on the relative positions of the sending and receiving mobile nodes. A mobile node including both GPS and a compass can be used to further specify how messaging is communicated in the system.

The transceiver 104 includes a number of devices that transmit and receive wireless communications using radio waves. These transceivers 104 enable mobile nodes 102 to communicate wirelessly with the communication network. The transceivers 104 include a radio access network (RAN) in a cellular radio network, a WiFi hotspot/WiMax base station, or a Femto access point. The RAN can include an eNodeB (eNB), a nodeB (NB), or a base transceiver station (BTS), for example. A WiFi transceiver can provide a wireless local area network (WLAN) connection using, for example, an 802.11 protocol. A WiMax transceiver can also provide a high speed wireless LAN capability over a larger distance than a WiFi transceiver. A Femto access point provides a cellular radio access network transceiver over a small area, such as a home, and connects with the network over a broadband connection. A Femto access point can be used to provide wireless cellular network coverage in areas lacking coverage.

An access gateway 106 provides connectivity between the transceivers 104 and the communication network. The access gateway 106 can manage connections and communication with and among mobile nodes 102, mobility aspects of mobile nodes 102 such as handoffs, paging, and other mobility events, transceiver 104 selection, and can provide a connection to the carrier network 110. In some embodiments, the access gateway 106 can be provided using one or more other devices such as a serving gateway (SGW), serving GPRS support node (SGSN), packet data serving node (PDSN), a mobility management entity (MME), or any other device. The carrier network 110 provides connectivity back to the core network such as the Internet. The carrier network 110 can be an IP packet based network with a collection of routers to move packet based communications originating from the core network, mobile nodes, or other endpoint devices.

The carrier network 110 connects the packet gateway 112 to the access gateway 106. The packet gateway 112 can provide an anchor functionality and accounting functionality for packet based communications in the communication network and serves as a gateway for access to the Internet. The packet gateway 112 anchor functionality provides a fixed reference point for contacting and locating a mobile node 102, which can move among transceivers 104. The packet gateway 112 can also provide billing and accounting functions and assist in authenticating mobile devices before allowing them access to the network. Some packet gateways 112 can also assign addressing information so that the mobile node can begin a communication session with the communication network.

The AAA server 114 includes accounting and authentication information for mobile nodes. The AAA server 114 can track usage of the mobile node to later provide billing for usage and can store mobile node subscriber information such as the subscriber identity module (SIM) information, international mobile subscriber identity (IMSI), or identity information used to link mobile node 102 specific identity information with subscriber profile information. The subscriber profile information can include an IP address and other information. In some embodiments, the packet gateway 112 includes subscriber profile information such as IP address, location information, and status that can be used to initiate communication with a device.

The IP core network 116 can provide IP packet based communication to various servers and other networks. The IP core network 116 can be the Internet that allows various content servers, application servers, and other Internet connected network devices to communicate with one another and also to mobile nodes 102 through the communication network 100. The remote processing server (RPS) 108 can communicate through the IP core network 116 to send messages and data to mobile nodes 102 and devices such as a landline phone 120 and an Internet connected device 122. These devices can include mobile nodes, Internet Protocol (IP) enabled phones, phones on the plain old telephone service (POTS), computers, Internet enabled TVs, video game systems, Internet enabled appliances, car entertainment systems, and airline entertainment systems. The remote processing server 108 is a server that manages information regarding mobile node 102 users and devices, and messages sent between them, in order and communicates with mobile node 102 users and also network devices in communication network 100 to obtain additional information about mobile node 102 users. The remote processing server 108 organizes this information and analyzes the information in order to make connections and/or communicate among users or devices. By compiling information about user devices, such as mobile node 102, a landline phone 120, and an Internet connected device 122, the remote processing server 108 can use algorithms to determine user devices that meet criteria to send a message from an initiating user device to one or more receiving user devices.

Figure 2:
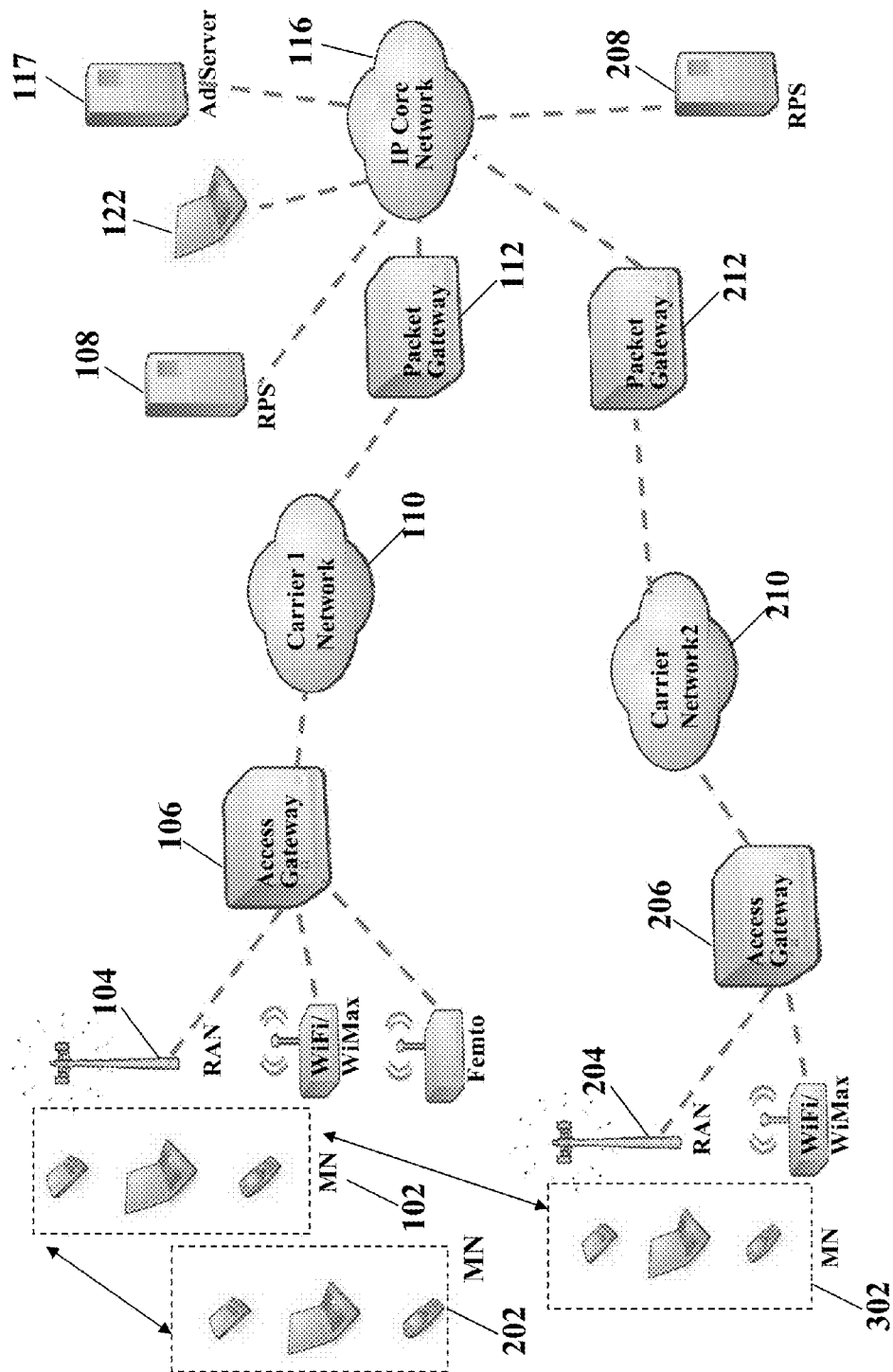
FIG. 2 illustrates multiple communication networks that provide communication to recipients whose traditional identification information is unknown in accordance with certain embodiments.

FIG. 2 illustrates multiple communication networks that provide communication to recipients whose traditional identification information is unknown in accordance with certain embodiments. As shown in FIG. 2, messaging can occur between networks of different service providers. In some embodiments, a first service provider can operate and control network 1 that includes transceivers 104, access gateway 106, carrier network 110, and packet gateway 112, while a second service provider operates and controls network 2 that includes transceivers 204, access gateway 206, carrier network 210, and packet gateway 212. The components of network 2 including transceivers 204, access gateway 206, carrier network 210, and packet gateway 212 can provide the same or similar functionality as described for their counterparts in network 1, namely transceivers 104, access gateway 106, carrier network 110, and packet gateway 112. In some embodiments, the radio access technology can differ between the first network and the second network. For example, the radio technology in network 1 can be CDMA based, while the radio technology in network 2 is based on 4G (LTE) or UMTS. The technology presented herein can be independent of service providers and the protocols or radio access technologies used by the service provides. As such, an AT&T iPhone (e.g., mobile node 102a) can communicate with a Verizon Blackberry device (e.g., mobile node 202) in some embodiments. Mobile nodes can also communicate with both mobile nodes on their network and other networks. For example, mobile node 102a can communicate with mobile node 102b and mobile node 202.

FIG. 2 also illustrates how more than one remote processing server may be used in certain embodiments. Remote processing servers can be provisioned based on loading conditions as well as geographic distance. For example, remote processing server 108 can have a capacity of a certain number of mobile node users, such as 100,000. When this capacity is exceeded, then performance begins to degrade. The capacity of each processing server can also differ depending on the hardware, such as processing speed, of each individual remote processing server. However, additional remote processing servers can be provisioned to handle the additional load. For example, remote processing servers 108 and 208 can be used to handle incoming mobile node user requests. In some embodiments, remote processing servers 108 and 208 can be co-located in a geographic area. In other embodiments, each remote processing server is located in a different geographic region. For example, remote processing server 108 can be located in Boston and serving the Boston region, while remote processing server 208 can be located in New York City and serving the NY metropolitan area.

Remote processing server 108 can work with multiple networks and handle mobile node user requests from the same or different radio access technologies. For example, remote processing server 108 can handle a request from mobile node 102*a* and send messages to mobile nodes of multiple networks, such as mobile node 102*b* and 202. As such, remote processing servers are independent of both the technology used in the network and the different networks. The remote processing server can operate across different technologies and networks by using higher level protocols that are common across different technologies and network providers. In some embodiments, the XMPP protocol can be used to provide messaging to users and receiving messaging from users. Remote processing servers can share database information amongst one another in some embodiments. For example, if remote processing server 108 receives an update to its database, it can propagate this update to other remote processing servers such as RPS 208 in order to maintain a common database amongst the remote processing servers.

In other embodiments, information can be stored in remote processing servers based on geographic areas. These geographic areas can be broken into cells like a radio transmission network and each remote processing server can be assigned one or more cells to handle. The remote processing servers can then synchronize on the basis of the geographic regions that each are handling. For example, remote processing server 108 and remote processing server 208 can synchronize on the geographical regions where they overlap. The cell divisions or geographic regions can also be used to determine how user requests are directed to remote processing servers. In some embodiments, the remote processing servers include geographic information such as geocode information that can be used by each remote processing server to determine if it should handle an incoming request. The geocode information can also be used in making a decision at a first remote processing server to forward a request to a second remote processing server. The geocode information can be used in conjunction with real time load information in order to dynamically change the remote processing server that is handling certain requests.

An ad server 117 can communicate with one or more remote processing servers. In some embodiments, the ad server 117 can be implemented on the same device as remote processing server 108. The ad server 117 can be used to communicate messages to one or more mobile or wired-device nodes. The messages can be communicated across networks implementing different technologies and across different network operators. Ad server 117 also provides an interface for communicating with users. The users can be mobile nodes 102 and 202, for example. The interface can be a portal to access the ad server such as a web-based portal where a person such as an advertiser can log into the system to upload content, send messages, and view statistical information regarding prior activities such as messaging users in the system. The ad server can also track activities of people who log into ad server 117 for accounting and billing purposes.

FIG. 2 can further be used to describe the operation of one embodiment. The mobile node 102 (e.g., an iPhone) or other wireless device downloads a software client application (sometimes referred to as a "client app") from a server, such as RPS 108, or a server maintained by an independent distributor of software applications, such as the Apple App Store. RPS 108 or the independent distributor can provide the software client application through an interface, such as a website on the Internet 116. In some embodiments, the client application can come embedded as firmware in the mobile node, as software already installed by the device manufacturer, distributor or vendor in the mobile node 102, or downloaded onto a personal computer, laptop, netbook, telephone, or other device using an internet connection. After installing the client application, the user can enroll mobile node 102 by running the client application. The client application solicits personal information (such as the individual's name, e-mail and password data) and/or mobile node information (such as a device phone number). Once the user completes the enrollment of the mobile node, the mobile node can communicate this information to register itself with the remote processing server 108.

Other users would follow a similar process to download the client application to their respective enabled devices (e.g., MN 202), and to enroll those mobile nodes with the server (e.g., RPS 108). These enrolled users can be considered service users with those service users who have their client app running at any given time considered an active service user. The remote processing server 108 maintains a continuously updated database of registered devices including mobile nodes and service users. This database can be referred to as a service book, in some embodiments. The service book can be maintained on a secure server (e.g., RPS 108) that includes connectivity to a network. This connectivity includes an Internet connection to IP core network 116, which provides connectivity to at least carrier network 1. Alternatively, the remote processing server can be connected to a public switched telephone network (PSTN) and through the PSTN connect to either the IP core network 116 or to a registered device.

Using features of the client app, service users can configure their registered device to send and receive service messages, such as social messages. The service message sent from the client application on the mobile node to the remote processing server can include message settings, message information, and content information. The content information includes voice, text, photo, video, or other message. The service message information includes information about the mobile node and the service user such as the phone number or other identifying information of the mobile node and service user. The service message information is used by the remote processing server to locate the service user, which is then used in determining to whom the message is sent from the remote processing server. The service message settings include instructions of how the remote processing server is to handle the service message.

The service message settings can include a number of parameters such as direction of phone, directional range, distance based on location, distance range, type of message, and/or characteristics of intended receiver. One or more of these parameters can then be used by the remote processing server to determine which mobile nodes receive the service message. For example, a service user can communicate with other service users who are located within the select parameters of the message settings included in the message sent from the service user's device to the remote processing server. The service message settings define a zone that can be determined using the parameters of the message setting with an algorithm on the remote processing server. For example, the zone is determined using the geocode location of the sending mobile node with the distance parameters (e.g., 800 feet) to draw a zone around the service user. Other service users that are located within the zone are in-zone users (IZU). Service users can initiate a communication using any media (voice, text, photo, video, music, etc.) with such other in-zone users. In some embodiments, the communication would be an short message service (SMS) message or other text message inputted into the client application.

The service messages can also be sent to other service users regardless of their location or to a combination of in-zone users and other specified users. The service message can indicate this information to the remote processing server so that the remote processing server can send the message to the specified users and the in-zone users. The specified users can be members of specified groups, such as friends, running team, or coworkers, for example. The type of message can indicate that the service message is for service users with specified interests. In these cases, the type of message can be used to communicate to a subset of people within a certain geographical range. These can include activities or interests, for example, running, volunteer work, tour groups, or other services. For example, an employer can use the service to communicate with nearby employees to send location based messages, a community group can use the service to send messages to volunteers working on a project, single women can message single guys at an event, or even police officers can use the service to communicate directly either with nearby officers or with first responders from fire, homeland security, medical or other agencies.

The groups can be managed and configured on the remote processing server. The groups can also be used to send a message to a specified subset of service users. The messaging can be sent to members in a group that are in-zone users. The groups can be configured such that membership is open to any service user who wishes to join, membership is limited, or membership is closed. If membership is limited, then a service user needs to provide challenge information, such as a password to be added to a group. In a closed membership group, only administrators of the group can add or remove group members.

Upon receiving the service message at the remote processing server 108 from the mobile node 102, the remote processing server can use the service book and the server database to authenticate the mobile node and the sender's credentials. This can include comparing the service message against data in the service book and confirming that the service message has been sent from a service user, that the identity information of the service user is valid, and that the message settings are proper. The remote processing server can store the identity of the sender, the message settings, and information regarding the sending mobile node.

The remote processing server can remove or strip from the service message the message information in order to maintain the privacy and anonymity of the sender. These privacy settings can be user selected and managed on per-recipient level using the client application. For example, the setting can be set so that the remote processing server would send the service message without stripping all of the message information when sending to in-zone users and/or group users. Service messages that include some or all of the message information can be referred to as public messages in some embodiments. The information stripped from the service message can include the phone number of the sender's device and any other device information revealing the identity of the sender's mobile node. The remote processing server can then add a specific tag identifying the stripped message to the processing server. The tag can be in memory or a database along with the associated message information. This association allows the remote processing server to identify the sender and the original service message prior to being stripped of identifying information through the tag. The tag can be randomly generated to make it non-traceable. The tagged message can then be sent from the remote processing server to the in-zone users or group users specified in the sender's service message.

The service messages sent from the remote processing server may be called processed service messages (PSM) in some embodiments. The processing server can then send the processed service message to in-zone users and/or group users. Using a feature of the client app, in-zone users or group user mobile nodes would receive the processed service message and determine how to handle the processed service message. The client application can display the content of the PSM on the device, display an alert that a PSM was received, store the PSM for later alerting the service user, or discard the service message. The client application of the receiving mobile node can allow the service user to configure filters that define how and when inbound messages are displayed to the service user based on one or more parameters. These parameters can include time of day, message sender, type of message, and geographical information.

Using a feature of the client app, each PSM recipient has several options for responding to the PSM. These options include ignoring the sender and the current PSM, blocking the sender and future PSMs from the sender, responding to the sender via a reply message, or responding to the sender and the other in-zone users or group users via a reply service message. The PSM recipient as a sender of a service message, including a reply service message, can select whether the service message is sent via a public message or a tagged message. The PSM recipient can also use the client application to identify particular senders using a nickname or handle and can mark any specified sender as a buddy, from whom they elect to receive or be alerted to future service messages using specialized criteria. Using features of the client app and the remote processing server, in-zone users or group users would then have the ability to carry on new or continued communications with the caller and other in-zone users or group users via tagged or public messages. The service message sender and PSM recipient may, respectively, each ask the other to disclose her/his name, phone number and/or other identifying information, and if they do so, they may continue to communicate via the service and/or other traditional communications methods.

The remote processing server can allow conditions to be placed on how service messages are handled. These conditions can be set based on service user specifications and/or operator's specifications. The service conditions can include locational or duration limits on the service message's availability, such as the following: (i) in the case of in-zone users, as long as the pertinent in-zone user devices remain within the zone, and (ii) in the case of group users, as long as the communications transpire within a limited period of time specified by the pertinent group users, which can be a dedicated session in some embodiments.

In some embodiments, service users can send a service message after they have left a zone or discontinued a dedicated session to send service messages both to service users with whom they have previously sent or received a PSM, regardless of whether such service user remains in-zone in the original location or has discontinued a dedicated session. The client application and remote processing server can also be used to send a voice communications as a PSM ("voice PSM") to targeted in-zone users or group users.

In one embodiment where voice PSMs are provided, either the App on the device detects, collects and sends the mobile phone number of the user's device to the RPS, or the user types her device phone number into a registration field at the time of registration, or at a later time, when updating her user profile page. The RPSS can retrieve the user's mobile phone number from the user's registration data or user profile, and then records and stores the mobile phone number in the User Book and the Service Book. Then rather than typing in a text message into the text field, the user can tap a voice button at the bottom of the client app message screen, and a new screen pops up that includes a start button, a stop button, a replay button, a delete button, a volume meter, and a send button. To record a voice message, the user can press the start button, and start talking to record the voice message. While speaking, she may observe the volume meter to identify whether she is speaking loudly enough for a clear recording. When finished, she will press the stop button. To replay the message, the user touches the replay button, and listens to the message. If she is not satisfied with the message, she may tap the delete button and then repeat the process. If she is satisfied with the recording, she sends the message by tapping the send button.

The user may elect either: to listen to the voice PSM by tapping softly on the message alert on the client app message screen in order to highlight that message, and then taps on the listen button at the bottom of the message screen; or to retrieve the voice PSM as a text message, and read the content of the message when displayed as text in the message screen. Recorded messages can be transmitted using IP Telephony and either the IP address or MAC address of the device phone, and recorded by the RPSS. Real-time voice communications can be completed via either the public switched-telephone network (and using the actual telephone numbers of either or both mobile devices on the call, as provided by the users during registration with the PoKos service or added to their user settings post-registration), or using VOIP and the IP address of the device phone The recipients of the voice PSMs can receive the incoming voice PSMs as a traditional voice communication, display the content of the voice PSM as a text message, or receive an alert that a voice PSM has been received. If the recipient receives the voice PSM as a traditional voice communication then it is received by the mobile node as a regular phone call and the recipient can either answer it with live interactive voice communication with the sender or direct it to voicemail. Each voice PSM recipient can respond using the same response options as described above for a regular PSM. A service user can also initiate a PSM for communication, in whole or in part, of data, video, photos, voice, text, or some other combination of media. This may be referred to as communications PSMs (CPSMs) in some embodiments.

The client application can also be downloaded and installed on other non-mobile devices. In some embodiments, the client application for computers is different from the client application for mobile nodes. For example, the computer client application can have options that are not necessary for a mobile node because it is not mobile and may not have GPS information at its disposal. The computer client application can still be used to send service messages to other service users. In some embodiments, geocode information can be calculated based on the address of the property or other information; a postal service zip code; telecommunications area codes or LATAs; and be used as the location information. In other embodiments, associational information can be based on IP addresses; domain information; or Internet Service Provider information. In this fashion, a service user on his computer can receive in-zone service messages from other system users. This can be useful to correspond with neighbors and find out about things going on in the area. In certain embodiments, the computer client application can send or receive service messages just like a mobile node client application. The computer client application can also be used, as described further below, for sending messages to service users meeting certain criteria. For example, the service user can send and receive service messages not only from and to a registered mobile node but more broadly from or to any computer or other device running a client app and enrolled with the remote processing server. In one embodiment, at the bottom of the client app message screen, the user can tap the "file" button, and then tap and highlight from a pop-up menu list either "photo", "video" or "other", and then make choices from the devices file hierarchy list by tapping on a series of two or more folders and files until she identifies the photo, video, or other file she wants to send, and then highlights that file, and tap "okay."

In certain embodiments, the remote processing server can send service messages to mobile nodes that are not running the client application. The remote processing server can detect mobile nodes based on location information provided by the device. In some embodiments, this location information is provided by the device to any request for location information. The remote processing service can use an active discovery or a passive discovery mechanism to detect mobile nodes that include location based information. The active discovery mechanism works by pinging mobile nodes to get location based information. This location based information can then be stored in a database at the remote processing server and correlated with other data. In a passive discovery mechanism, the server detects phones that contact the server and provide location based information. In some embodiments, mobile nodes may support service messaging without the installation of a client application. These mobile nodes may natively support service messaging with the operating system of the phone or with a combination or pre-packaged hardware or software. In these embodiments, the mobile node contacting the remote processing server can allow the remote processing server to register the device.

In yet other embodiments, a device can have a client app installed on the device and use the client app without registering the device with the RPS. The client application can include the ability to use the PoKos service on any device that already has the PoKos technology pre-installed as software or firmware (such firmware or software herein, the PoKos technology), so that the PoKos technology enabled device even without registration with the service provider can send any type of service message to a device that is either in-zone or is part of a pre-defined group as described herein. In order to provide service to an unregistered device, the PoKos technology in each device can detect its location, using latitude/longitude data retrieved by GPS software and hardware running on the device, and also its internet protocol (IP) address and/or Media Access Control (MAC) address, and auto-transmit all such identifying information to the RPSS. The RPSS would retrieve such identifying information in the header or the body of all messages sent from the device, and maintain and update such identifying information in the User Book and the Service Book. The user of a device can send and receive service messages with other enabled or registered devices that are included in the RPSS.

In some embodiments, a user can program the device to send and receive service messages with designated other devices, without human intervention, at set time or times, and from time to time; upon the occurrence of specified conditions; and/or the failure to occur of other conditions; with the result that such automated device to device communications occur whenever and wherever desired.

In some embodiments, the ability to communicate with any device or group of devices that meet the specified filter criteria and are connected to the global communications network without the need for those devices to be registered or enabled devices. In this case the RPS determines the target set of devices by accessing the distributed global database of the global communications network through an API (rather than its own User Book) and then by determining the set of devices whose current characteristics of location, type, etc. meet the relevant filter criteria. The RPS can separate out the devices into categories and then send the messages as described herein. For example, registered devices can be handled by the RPS as other registered devices. Those devices who are not registered devices but are enabled with PoKos technology installed can receive communications if the RPSS includes their information. For those devices who are neither registered nor enabled devices can receive the communications via their existing IM clients along with invitation and instructions on how to become a registered or enabled device. These devices could also receive the messages through existing networks technologies such as short message service (SMS), multimedia messaging service (MMS), voice communications, web pages, or any other applicable technology.

Once a mobile node or other device has been entered into the remote processing server's database, then it can receive service messages. The messages can be group user or in-zone user service messages, where the remote processing server directs such service message to such recipient devices based on the server's detection, retrieval and analysis of GPS data and/or other device identifying information of each recipient device, including without limitation the recipient device's internet protocol (IP) address and/or Media Access Control (MAC) address. In other embodiments, a client app on the sending device, using Bluetooth, infrared or other wireless communications technologies, detects, retrieves and analyses such identifying information on each recipient device.

Figure 3:
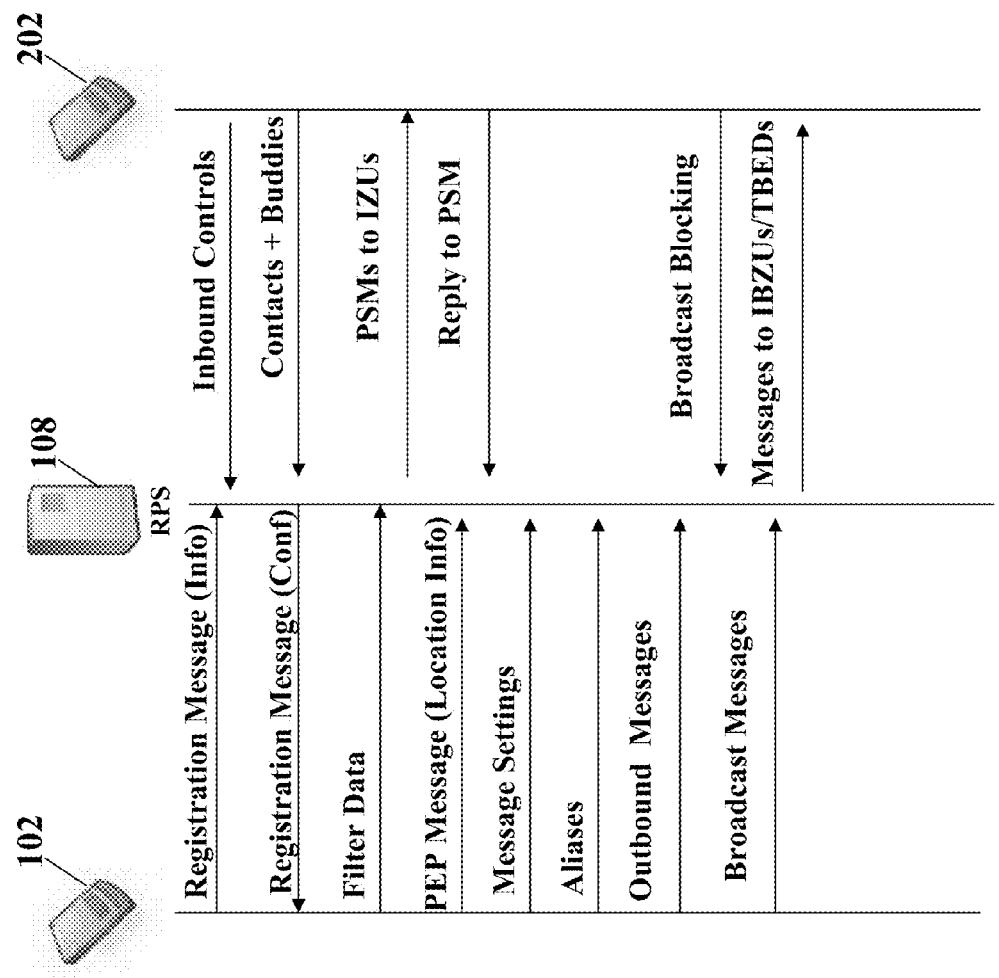
FIG. 3 illustrates messaging between mobile nodes where identification information is unknown in accordance with certain embodiments.

FIG. 3 illustrates messaging between mobile nodes where identification information is unknown in accordance with certain embodiments. FIG. 3 includes an originating mobile node 102, a remote processing server 108, and a destination mobile node 202. As shown, various types of messages can be communicated between mobile node 102 to remote processing server 108 as well as between mobile node 202 and remote processing server 108.

Figure 4:
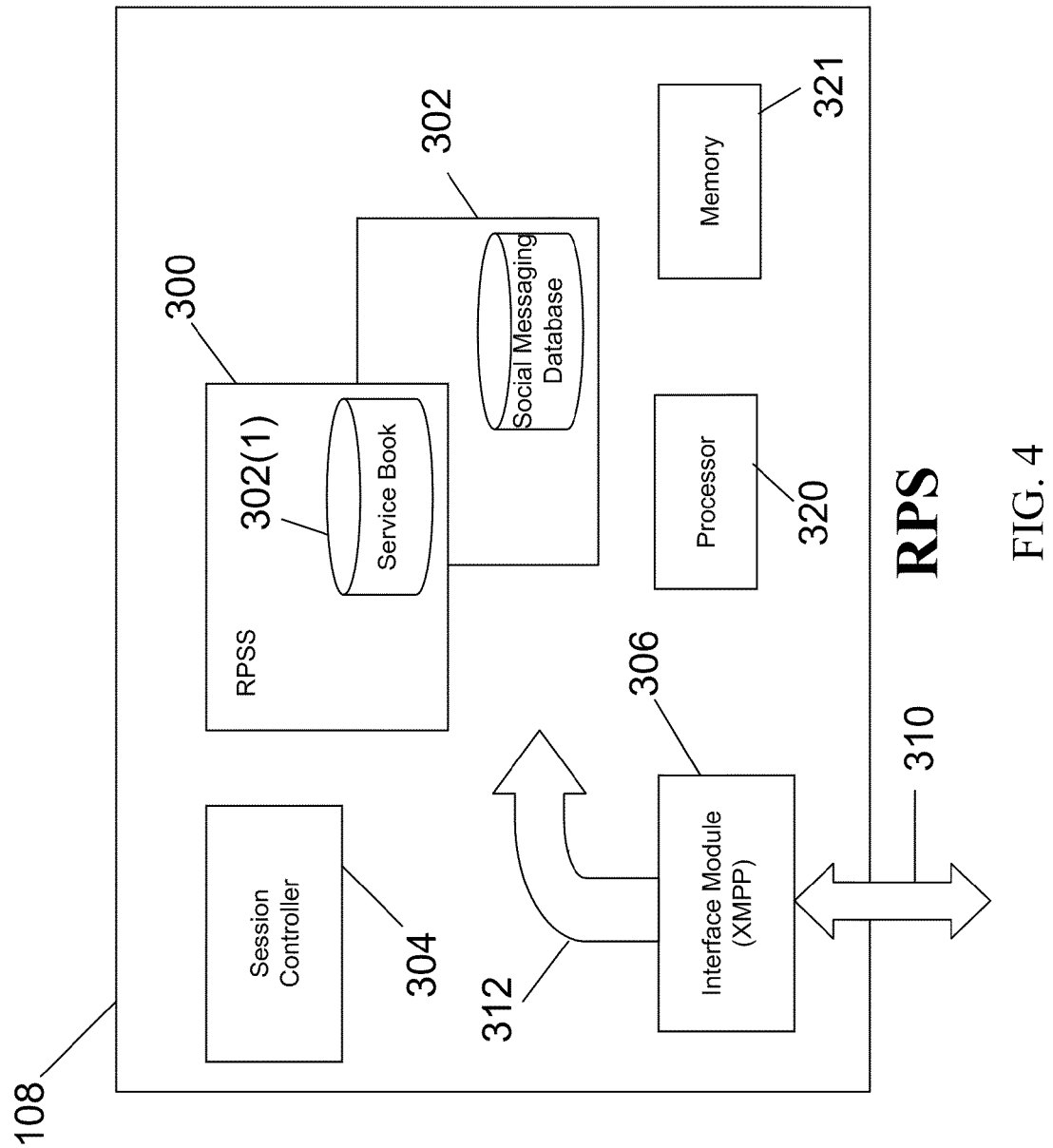
FIG. 4 illustrates a logical diagram of a remote processing server in accordance with certain embodiments.

FIG. 4 illustrates a logical diagram of a remote processing server in accordance with certain embodiments. Remote processing server 108 can include a number of components to provide social messaging and other functionalities. The remote processing server includes remote processing server software 300, a service book 302, a social messaging database 302, a session controller 304, an interface module 306, an interface 310, a processor 320, and a memory 321. The interface can include a physical connection with the network through a port. The port can include an optical or electrical communication interface to provide information received to the remote processing server. The interface module 306 can be used to send and receive extensible messaging and presence protocol messages with other devices on the network.

The remote processing server can operate securely to provide the communications, data processing and data storage services used to implement social messaging and other services. The remote processing server maintains an Internet connection through interface 310, and through the IP connection, indirect connectivity (operated and maintained by the telecom carriers) to the Public Switched Telephone Network (PSTN), and to the wireless networks. The wireless networks can be maintained by telecommunications carriers licensed by the FCC, such as AT&T, to transmit voice and data between and among mobile nodes, including iPhones.

The RPS uses connectivity to the wireless networks to transmit data messages to and from mobile nodes including iPhones using communications protocols such as Extensible Messaging and Presence Protocol, or XMPP, a standard open-source messaging protocol for presence and real-time communication, developed by the Jabber open-source community used by the carriers and compatible with the iPhone. XMPP consists of a set of open technologies for instant messaging, presence, multi-party chat, voice and video calls, collaboration, lightweight middleware, content syndication, and generalized routing of XML data; that was originally developed in the Jabber open-source community to provide an open, secure, spam-free, decentralized alternative to closed instant messaging services. Communication protocols other than XMPP can be used in some embodiments. This can include proprietary messaging and other presence protocols and services. Also other device/user identification information can used in place of JID such as device unique device identifier (UDID), machine access control identifiers (MAC address), email address and mobile phone number, for example.

The remote processing server software 300 can be stored in memory 321 and run on processor 320. The remote processing server software 300 maintains and accesses a user book. The remote processing server software 300 can also update the user book with information received regarding registrations and from other remote processing servers and other network devices. The user book includes a list of mobile nodes that have registered and downloaded the client application and updated registration information received from each mobile node. The RPS software also maintains a service book. This service book can be co-located in the database of the user book. The service book associates with each registered mobile node information such as user preferences for handling and transmission/receipt of personal and commercial messages. The RPS also maintains in memory 321, which can be implemented in random active memory (RAM) the mobile node's current/recent phone location. In some embodiments, the phone's current/recent phone location may be stored in the service book.

The client application can receive location information regarding the physical location of the mobile node. This location information can be updated when the location of the mobile node changes. The client application, in some embodiments, can receive notifications from the mobile node operating system when the location has changed. The RPS can receive a Personal Eventing Protocol (PEP) message as an XMPP extension, where the message includes the new location identified by latitude and longitude values. Upon receipt of the updated location information at the RPS, the RPS performs calculations to determine if the mobile node moved within range or out of range of specified Target Areas and send any appropriate SPAR and Event updates. Upon receipt of the updated location, the RPS stores the new location for the mobile node in memory 321 or a database 302, which can be queried later for processing of chat messages or broadcast messages.

In calculating the distance/range information, the remote processing server software can calculate the distance between two points. The two points can be the geocode information of the sending mobile node and the geocode information of a second mobile node. Each point can be the location of a mobile node in the RPS user book. If that range is less than the message-sending radius, then the message is sent to those mobile nodes. If the range is more than the message-sending radius, then the mobile node is ignored and no message is sent; unless the sender has indicated that she wants to send the message to a particular person with known contact information.

When directing messages based on directional data, the client app uses the mobile device's digital compass to determine a relative compass bearing vis-à-vis the location of the sender's mobile device. The sender's mobile device transmits its geocode information and such compass bearing data along with the sender's message as an optional message parameter. When the remote processing server receives the directional data it projects out a circular sector, or cone-shaped area, defined as follows: (a) the apex (/vertex) of which is the sender's location; (b) the direction of the radii (/lateral surface) as defined by the compass heading and pre-defined central angle between radii (/lateral surfaces); and (c) the plane base of which is the distance specified in the sender's message (or, if the sender's message identifies a distance range, the arc (or conical cap) of which is specified as an additional area bounded by extending the radii (/lateral surface) to the maximum distance range selected in the sender's message and projecting an arc from the end of one extended radius (/lateral base) to the other). The remote processing server software then compares the locations of each mobile device in the RPS User Book, and if the location of those other mobile devices lies within such cone-shaped area, then the message is sent to such phones. If the mobile device lies outside this area, then the mobile node is ignored and no message is sent.

In some embodiments, the remote processing server can provide eligible user information back to the user that is sending a message. This eligible user information can report the number of matches that were made using the parameters selected by the user. For example, the remote processing server can indicate to the user through the client application that the message will reach three users if sent by the user. The user can use this eligible user information to determine if he wants to initiate the sending of a message. In some cases, the remote processing server may ask the user to change the parameters to cut down on the number of users that will be messaged or to increase the number of users that will be messaged. The latter can occur if no users are found using the parameters specified by the user.

Figure 5:
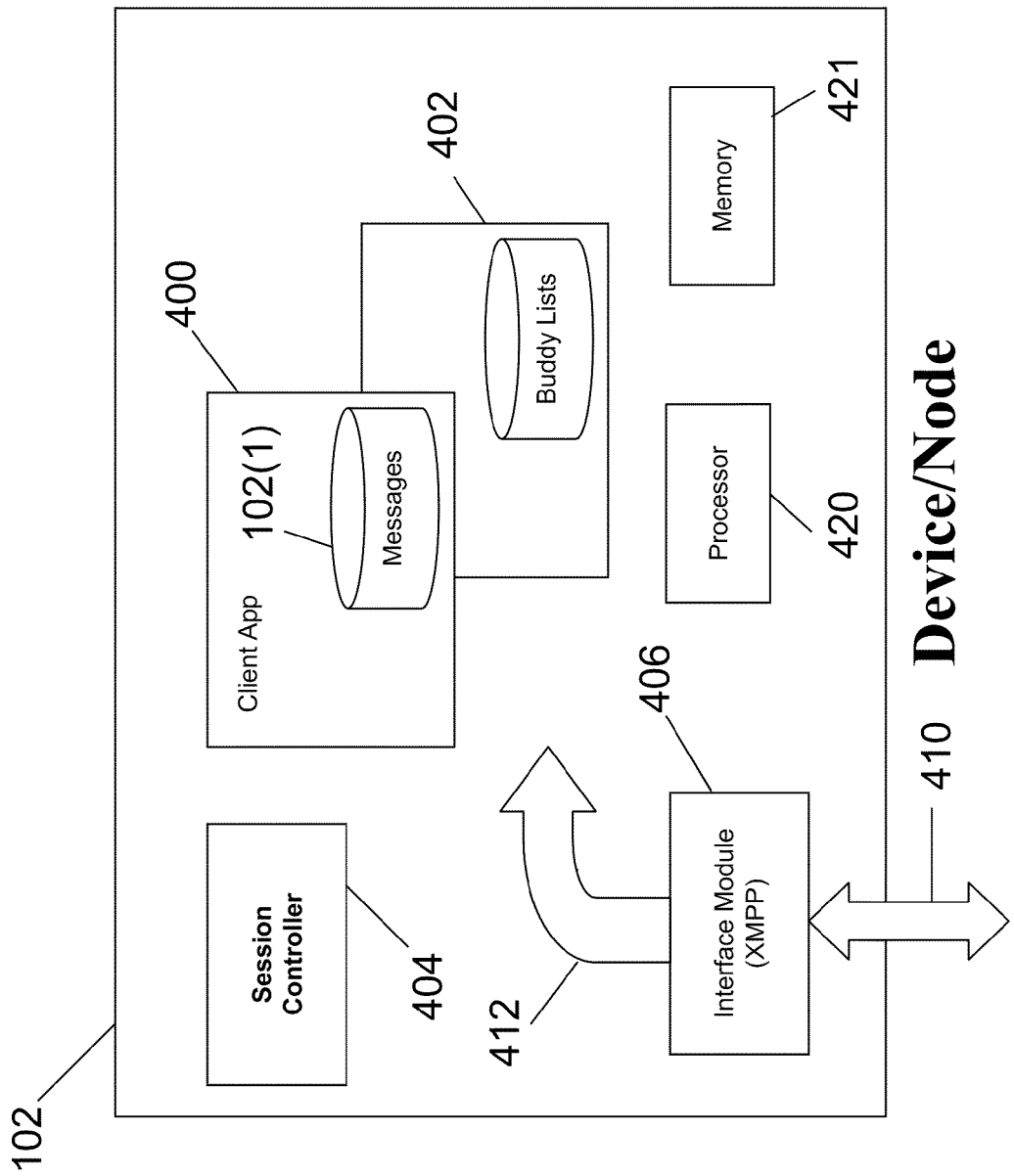
FIG. 5 illustrates a logical diagram of a mobile node in accordance with certain embodiments.

FIG. 5 illustrates a logical diagram of a mobile node in accordance with certain embodiments. Mobile node 102 can include a number of components to implement social messaging and other functionalities. The mobile node includes a client application module 400, a messages module 402, a buddy list 402, a session controller 404, an interface module 406, an interface 410, a processor 420, and a memory 421.

The mobile node described above can communicate with a plurality of radio access networks using a plurality of access technologies and with wired communication networks. The mobile node can be a smart phone offering advanced capabilities such as word processing, web browsing, gaming, e-book capabilities, an operating system, and a full keyboard. The mobile node may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile node may have the capability to run applications or communicate with applications that are provided by servers in the communication network. The mobile node can receive updates and other information from these applications on the network.

The mobile node can also keep global positioning coordinates, profile information, or other location information in its stack or memory. The mobile node memory 421 can be implemented as a computer readable medium, flash memory, a magnetic disk drive, an optical drive, random access memory (RAM), a programmable read-only memory (PROM), and/or a read-only memory (ROM). The mobile node can be configured with one or more processors that process instructions and run software that may be stored in memory. The processor 420 can also communicate with the memory 421 and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The mobile node can also provide a variety of user interfaces such as a keyboard, a touch screen, a trackball, a touch pad, and/or a mouse. The mobile node may also include speakers and a display device in some embodiments.

The client application running on the mobile node can receive location updates through the location service features of the mobile node. In certain embodiments, the client app registers with the iPhone Operating System (IOS) to receive location updates via the Location Services feature of the iPhone. If Location Services is currently disabled, the user will be presented a dialog that asks them to enable Location Services ("LS") and allow the client application to determine their location. If LS is already enabled, the user is only asked to allow the client application to determine their location. If the user declines to enable LS or allow the client application to determine the location of the mobile node, then the client app will display a message notifying the user than they can use the client app to IM with people they know, until they enable LS or otherwise provide location information.

The client app will receive notifications from the IOS when/if the location has changed, at which time the client app constructs a PEP, Personal Eventing Protocol an XMPP extension, message consisting of their new location identified by latitude and longitude values and sends this message to the RPS.

Figure 6A:
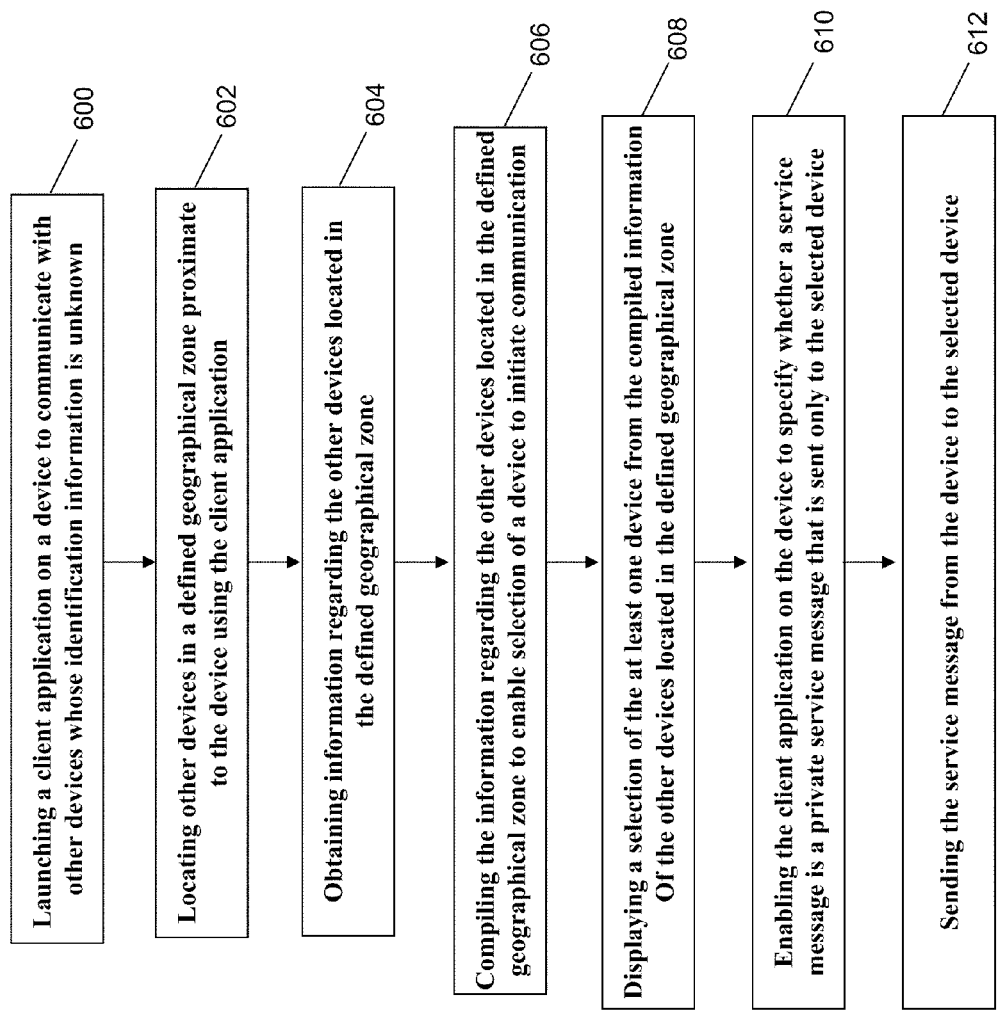
FIGS. 6A, 6B, 6C, 6D, and 6E illustrate flow diagrams of social messaging at a mobile node in accordance with certain embodiments.
Figure 6B:
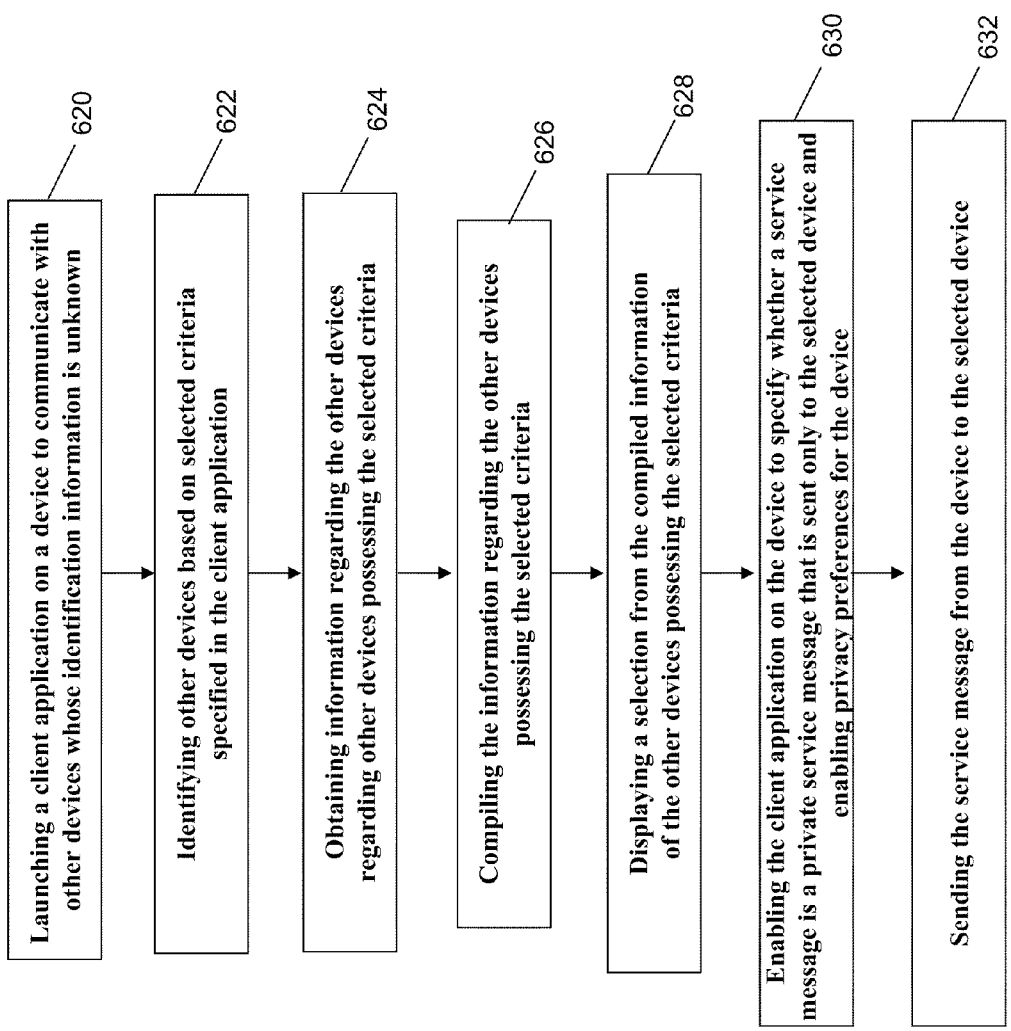
Figure 6C:
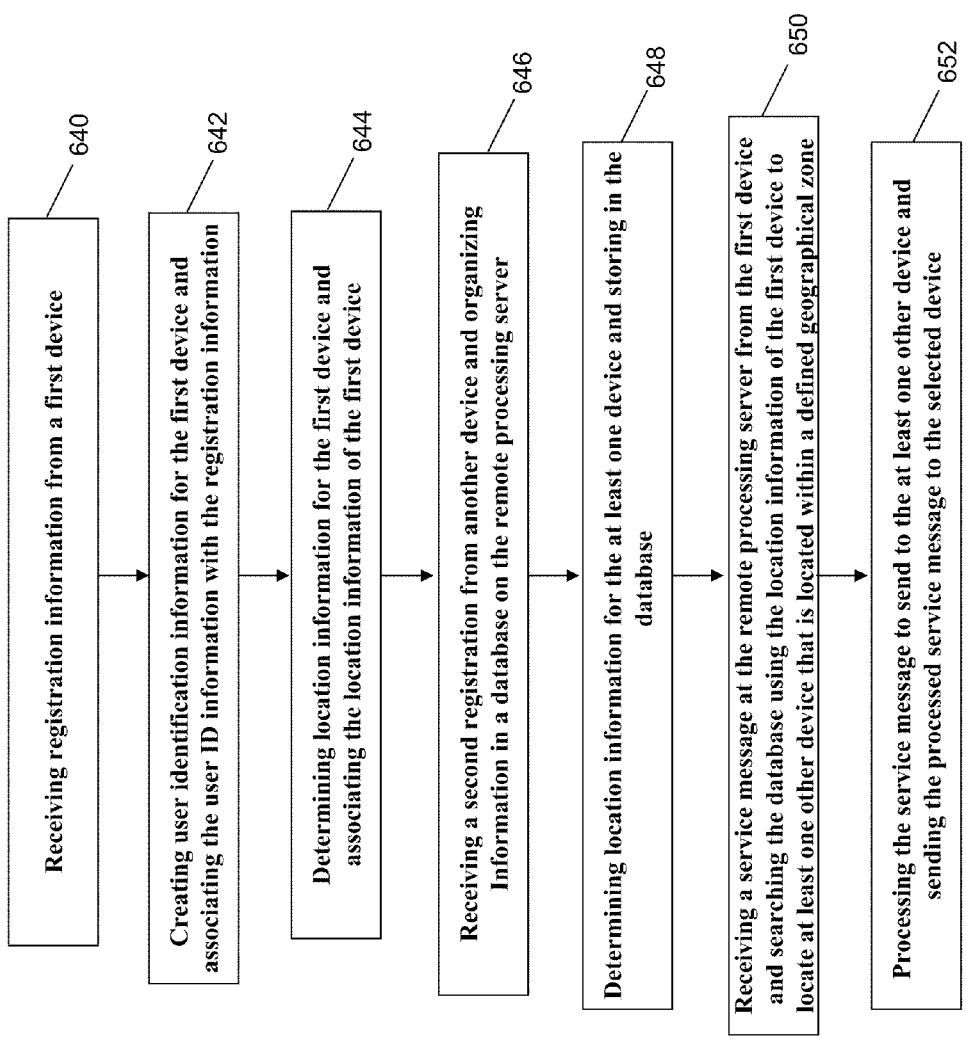
Figure 6D:
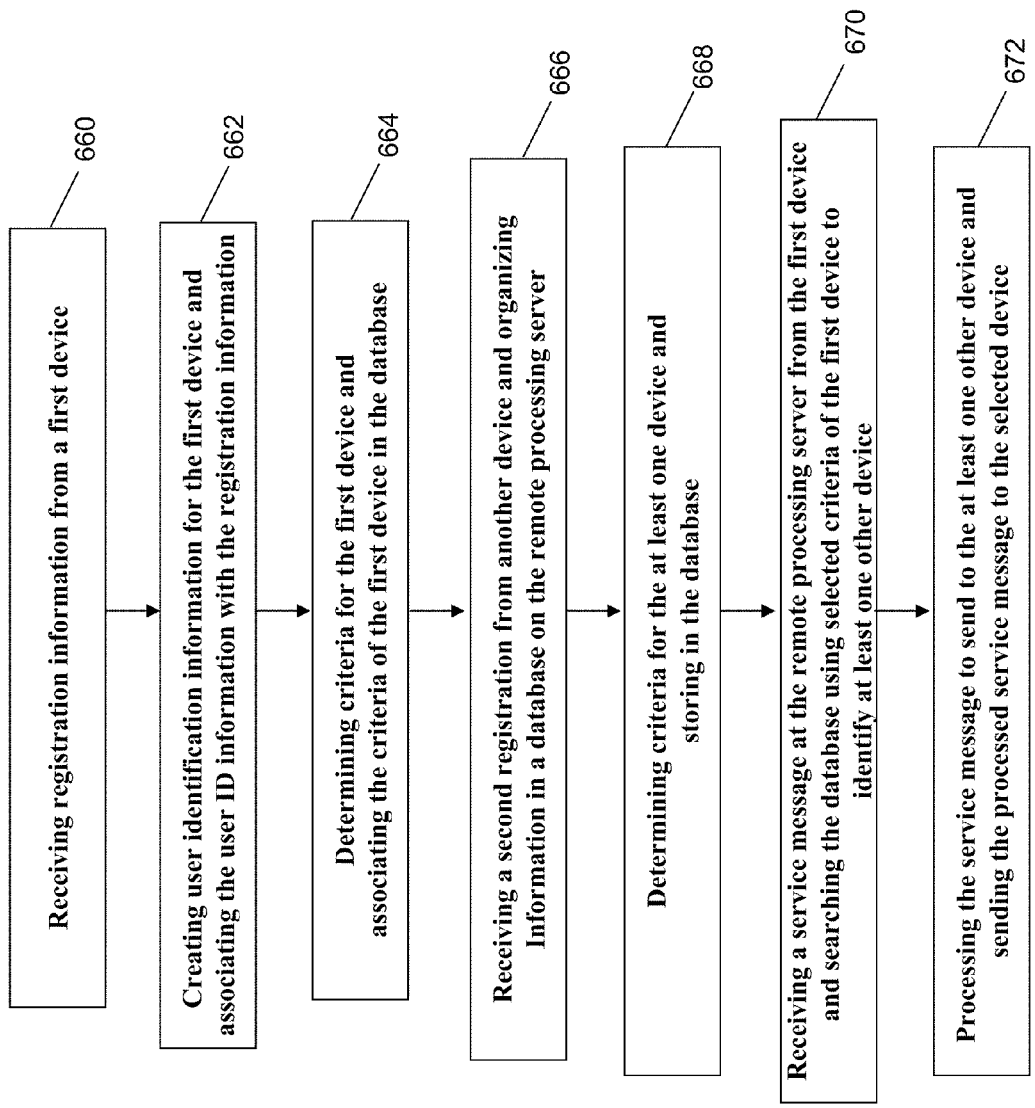
Figure 6E:
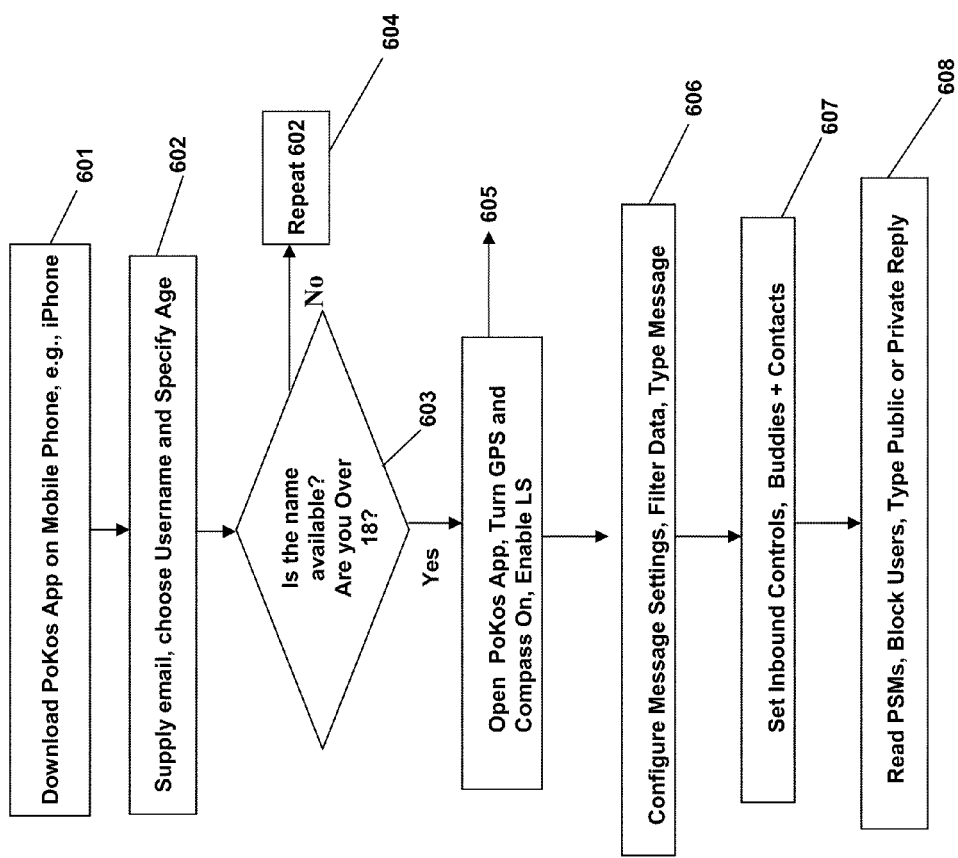

FIGS. 6A-6E illustrate flow diagrams of implementations of social messaging in accordance with certain embodiments. FIG. 6E describes installing a client application on a mobile node in 681, registering the mobile node with the remote processing server in 682, determining the age of the user in 683, making sure that location services is enabled along with GPS in 685, configuring options for using the client application in 686, setting inbound message controls and setting up buddies and contacts in the client application in 687, and read and reply to service messages received at the client application on the mobile node in 688.

Figure 7:
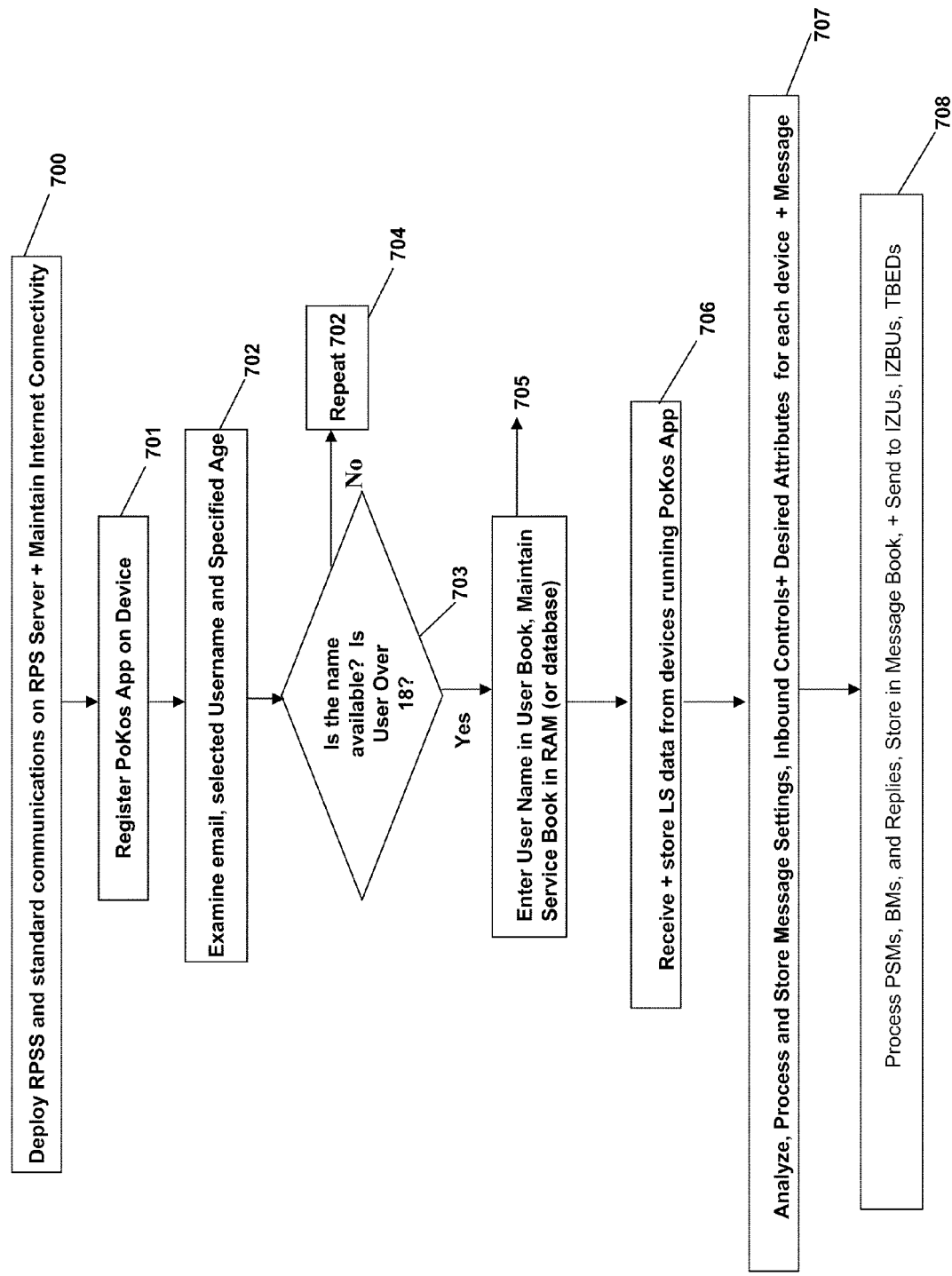
FIG. 7 illustrates a flow diagram of social messaging at a remote processing server in accordance with certain embodiments.

FIG. 7 illustrates a flow diagram of social messaging at a remote processing server in accordance with certain embodiments. FIG. 7 describes deploying software on a server in 700, receiving a registration of a user in 701, analyzing the registration information in 702, determining the age in 703, associating the user name with other information in a user book and maintaining a service book in 705, receive and store location information from client applications in 706, analyze, process, and store message settings, attributes, and other information on a per message and per mobile node basis in 707, and process the service messages and send to the appropriate destinations in 708.

Figure 8:
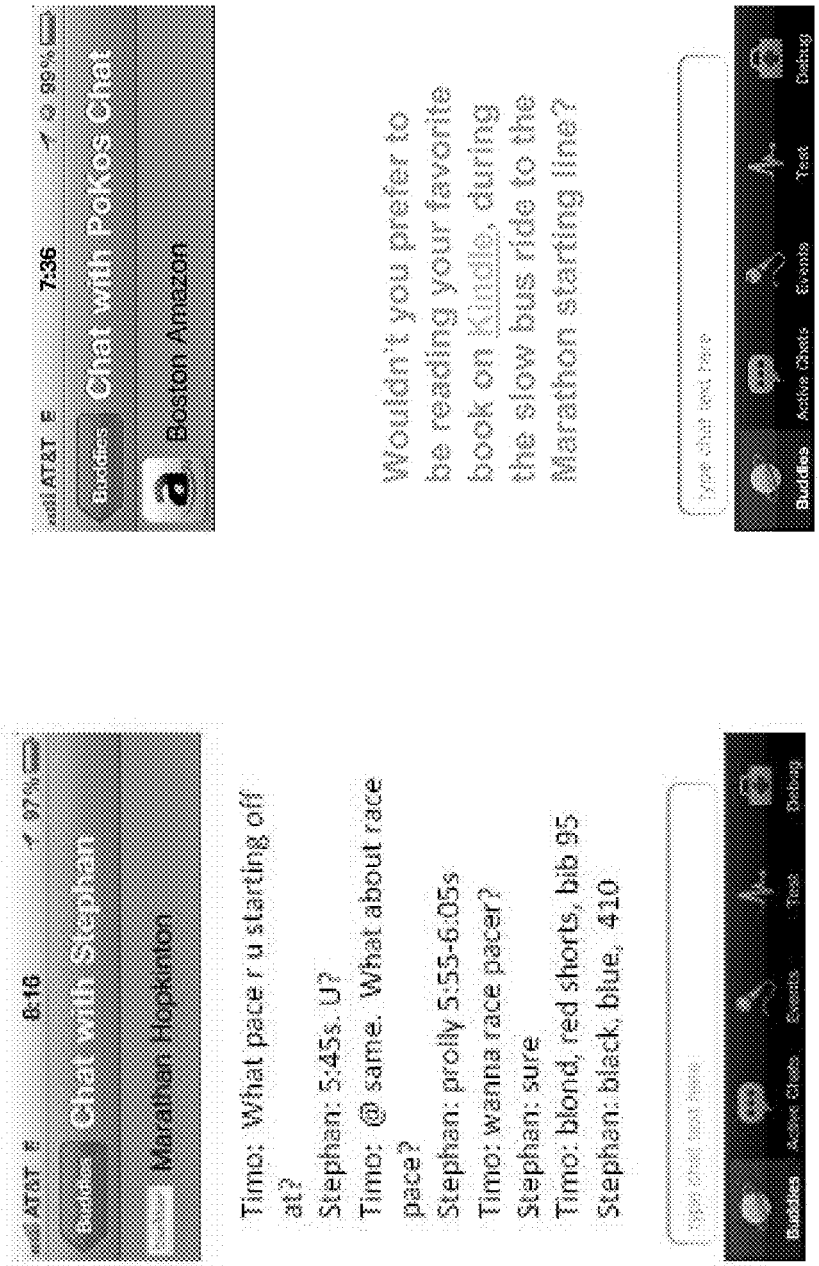
FIG. 8 illustrates a view of social messaging and broadcast messaging on a mobile node in accordance with certain embodiments.

FIG. 8 illustrates a view of social messaging and broadcast messaging on a mobile node in accordance with certain embodiments. In private social messaging, the graphical user interface of a client application running on an iPhone is shown. This interface allows the sending of messages to groups and unknown service users. The messaging can be used to find people with similar interests, such as a running buddy. In the broadcast messaging, messages can be sent to the client application based on location and other information. Here a commercial message from Amazon.com is displayed in the client application.

Figure 9:
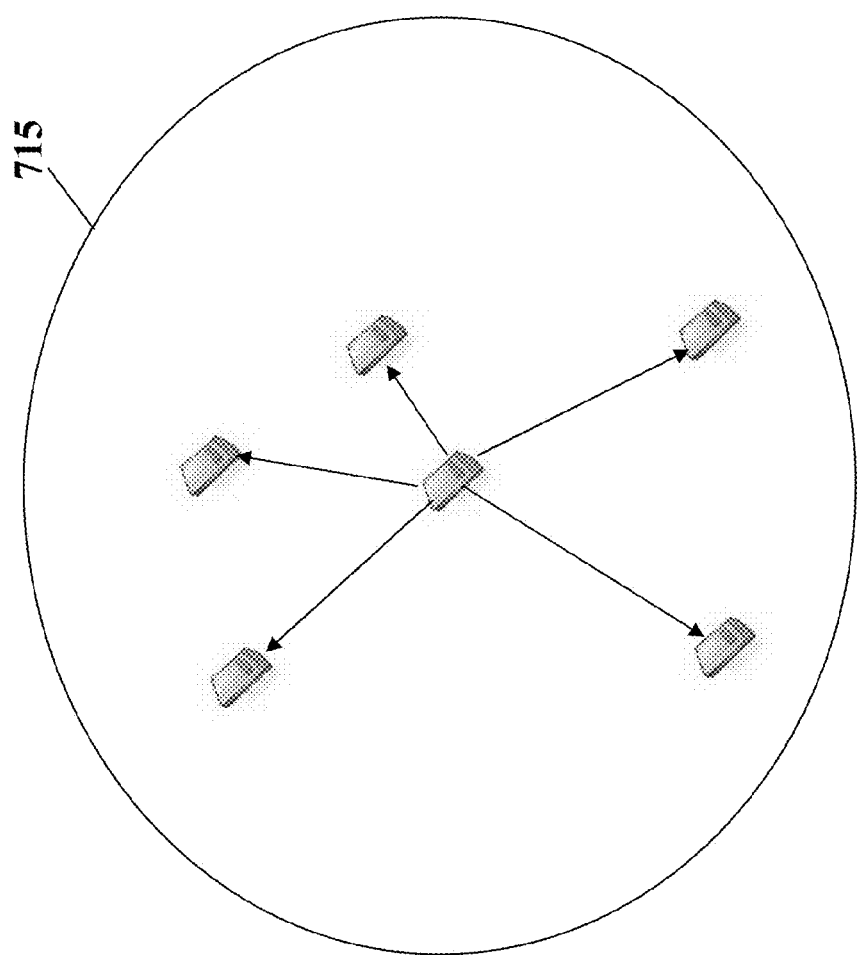
FIG. 9 illustrates social messaging to in-zone users from a mobile node using location information in accordance with certain embodiments.

FIG. 9 illustrates social messaging to in-zone users from a mobile node using location information in accordance with certain embodiments. As shown, a sender can send a message to one or more other mobile nodes that the sender does not have the contact information of or know by using the client application. The user does this by sending a service message that includes geocode or other location information along with message setting parameters that specify a zone 715 for communicating to other users. In FIG. 9, the parameter is a distance from the user. The remote processing server (not shown) uses this distance information and the location of the sender to calculate those users that fall these parameters. For example, if the sender specifies that a distance of 800 feet, then the remote processing server determines that only certain devices fall within this distance of the user and those users are included in the zone.

Figure 10:
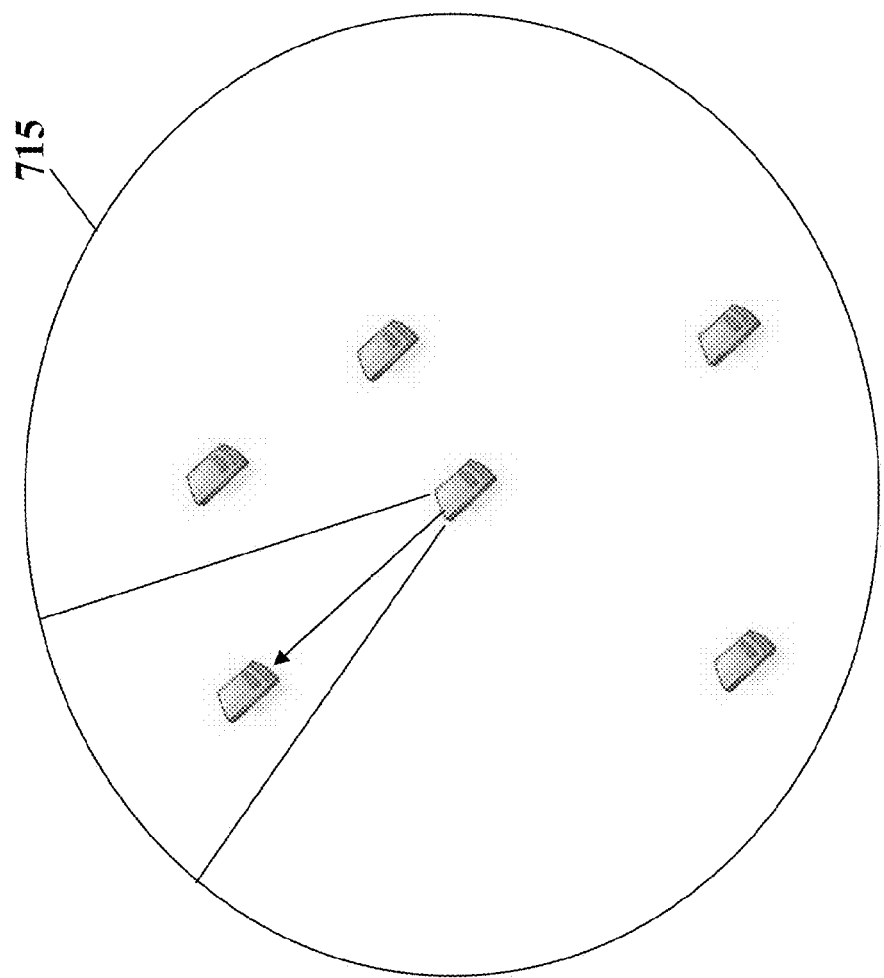
FIG. 10 illustrates social messaging to in-zone users from a mobile node using compass and location information in accordance with certain embodiments.

FIG. 10 illustrates social messaging to in-zone users from a mobile node using compass and location information in accordance with certain embodiments. As shown, additional parameter information can be used to further specify the users that receive messages such as direction information. This direction information can be obtained by a compass in some embodiments. The compass in combination with a distance parameter allow for sending the message to a subset of service users within the zone 715.

Figure 11:
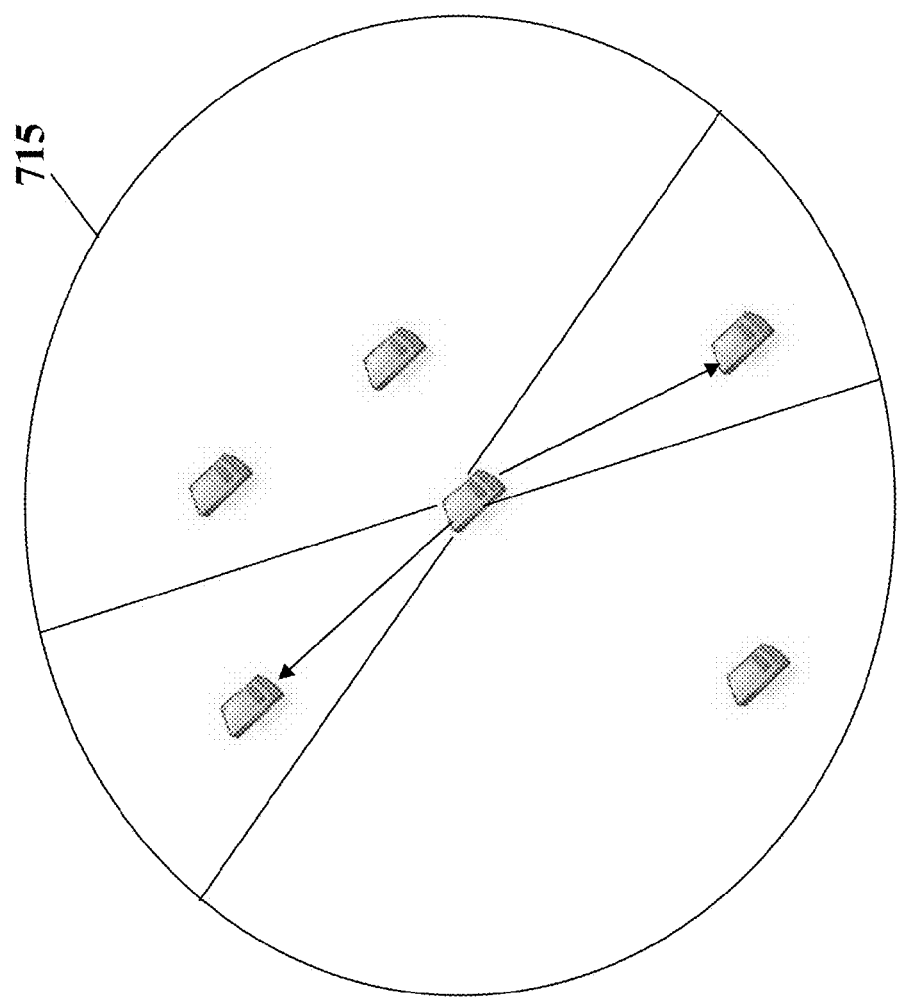
FIG. 11 illustrates directed social messaging to in-zone users from a mobile node using location information and other information in accordance with certain embodiments.

FIG. 11 illustrates directed social messaging to in-zone users from a mobile node using location information and other information in accordance with certain embodiments. As shown, directed messaging can include messaging certain specific users in a zone 715. This directed messaging can work based on filters or other attributes in addition to other information. In some embodiments, the user's mobile node may utilize short-range wireless technologies such as bluetooth to directly detect identifying information about the target mobile node. This identifying information, while not enough to directly communicate to that mobile node, can be used to communicate through the remote processing server. The identifying information can include the MAC address, the IMSI, the TMSI, the SIM, the IMEI, or the MEID of the mobile node. This identifying information can be sent to the remote processing server to determine if the user is a user with a user name.

This exchange can occur when a user points her phone at the intended recipient and taps send on the client application. The client application causes the user's phone to transmit a Bluetooth signal to the intended recipient's mobile node. The identifying information can be typical information included in a Bluetooth response message or can be sent by the client application running on the recipient's mobile node. In the latter case, if the recipient mobile node is running an active registered version of the client application, then the client application sends identifying information back to the other user's client application. This identifying information is then communicated back to the remote processing server so communication between the one or more users can be initiated.

In certain embodiments, the client application using infrared, short-range wireless technologies such as Bluetooth, and/or Wi-Fi technologies can be used to directly communicate messages between the mobile nodes. The can occur, in one embodiment, when a lightweight server functionality is embedded on the mobile node. The lightweight server functionality can perform some aspects of the processing and communicate with the RPS for database information. Once the contact information is obtained, then the user desiring to message a person in-Zone may send the messages directly to this mobile node bypassing the RPS.

Figure 12:
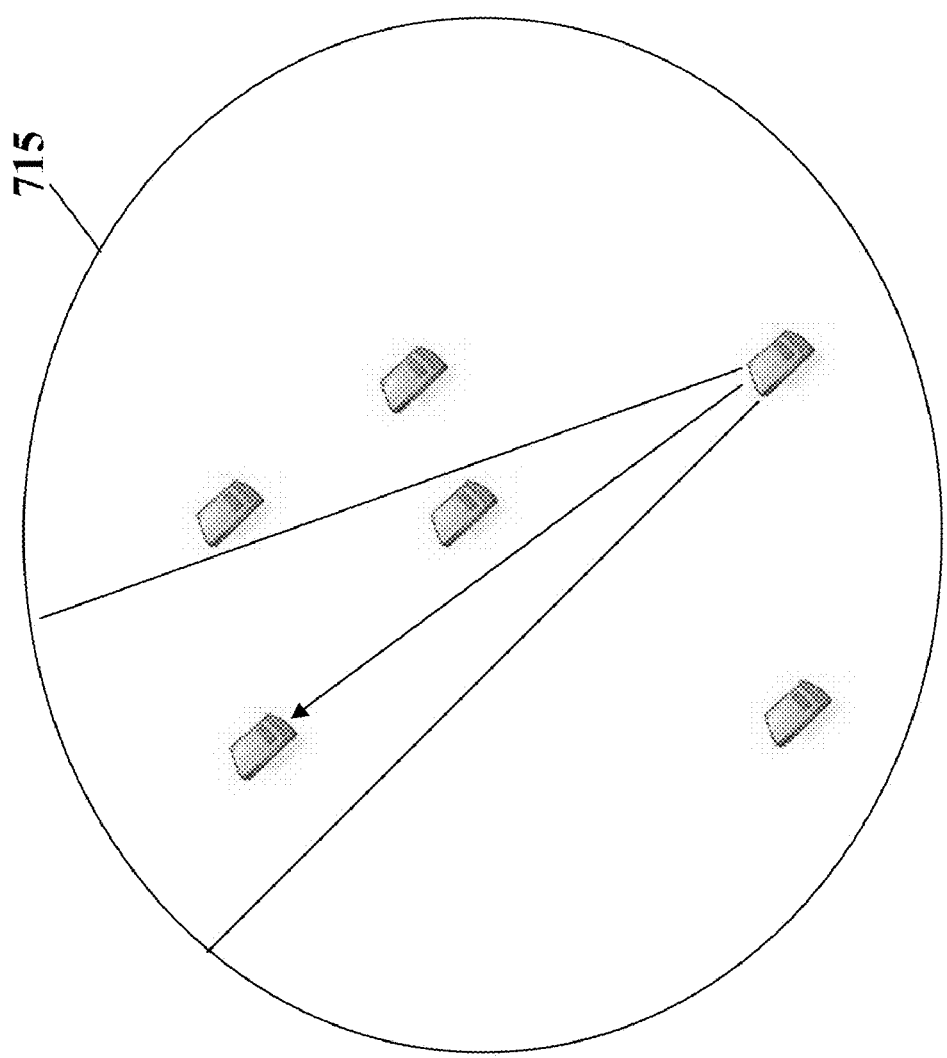
FIG. 12 illustrates directed social messaging to in-zone users from a mobile node using location information, compass, and other information in accordance with certain embodiments.
Figure 12:
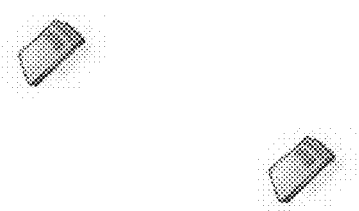

FIG. 12 illustrates directed social messaging to in-zone users from a mobile node using location information, compass, and other information in accordance with certain embodiments. As shown, filter information can be used in conjunction direction information and location information to direct messages to specific users. For example, the user in FIG. 12 can desire to talk to users who are single women and that are in the area. Here filters can be used to target users that are within a specified distance of the sender of the message. In FIG. 12, the direction information limits the number of users and then filter information is used to make a final selection among the users to target the message more specifically.

iPhone Embodiment

The features of social messaging can be provided on an Apple iPhone. In order to download the client application, the user opens the Apple App store on the iPhone. This can be done by tapping on the App Store icon on home screen of iPhone or opening a Safari web browser by tapping Safari icon on iPhone web screen typing in the browser URL bar the desired address for downloading the application. On another device such as a laptop/desktop, the client application can be downloaded by navigating to App Store download, or another website to download the software. The user then connects her iPhone with her laptop/desktop with her iPhone cable, waits for the iPhone to auto-sync with iTunes; as the result of which syncing the client app is installed on her iPhone, and the client application icon auto-appears on one of the iPhone extended home screens. The user can then proceed through steps 1 through 5 below.

STEP 1: On her laptop/desktop, user opens her web browser, and visits Apple App Store online, and then In search field of App Store, user types in "PoKos" and taps "enter" key on the iPhone keyboard, proceeds through steps 3-5 then syncs the iPhone with iTunes as described above.

STEP 2: With the web browser open on her iPhone or laptop/desktop, the user sees the PoKos icon either on the PoKos website or on an independent website, and either:
if on her iPhone, proceeds with Steps 4-5 below, or
if on her laptop/desktop, proceeds first with steps 4-5, then syncs the iPhone with iTunes as described above.

STEP 3: iPhone screen displays PoKos page, including an icon for downloading PoKos software application, product information, and download data.

STEP 4: In order to download the PoKos software, the user taps the 'free' button alongside the PoKos icon, and the letters on the button change to "install".

STEP 5: User taps the "install" button, and the App Store then transmits the PoKos client application either directly to the user's iPhone, if the App Store is being accessed from an iPhone (with transmission in such case occurring wirelessly over 3G or wi-fi enabled network to the user's iPhone, using the user's phone's IP address to identify the phone and direct the transmission to that phone); or first to the user's laptop/desktop, and then syncs to the user's iPhone as described above.

The client application (PoKos App) auto-installs on the user's iPhone, and the PoKos icon appears on one of the user's iPhone's extended home screens. The user then taps on the PoKos icon displayed on an extended iPhone home screen and types in his/her user name (also known as Jabber ID address) of a current Instant Messaging ("IM") application being used by the user on her iPhone, or requests a new user name as her Jabber ID address. The IM Jabber ID ("JID") includes the iPhone user's username and the resource they are currently logged in from, which might have a protocol such as '[first name]@domain.com/iphone', if connected by an iPhone, or if connected via desktop IM application such as Pidgin app: '[first name]@domain.com/pidgin'. This JID is then sent to the "XMPP server" of the third-party operating the IM service, which routes the message to the PoKos remote processing servers (RPS). In some embodiments, communication protocols other than XMPP and device/user identification numbers other than JID can be used.

When the user taps on PoKos icon displayed on iPhone's extended home screens, the iPhone screen opens and displays either a registration page, if the user has not previously registered, or a Login screen, if she already has registered. In order to use the PoKos App, the user registers the App by completing three data fields, typing in her desired user name and password, and typing in her age. The PoKos registration page also displays additional data fields for the user's email address, city, state, and gender, any one or all of which the user may elect to complete or leave blank. The user can also designate their email address, city, state, gender and age to be private in which case the PoKos server will not share with other parties. The default is private and each field can be set independently. The user the taps the register button at the bottom of the registration page on the iPhone. If the age field contains a value $\geq 18$, the PoKos App transmits the registration data to the PoKos RPS. If the age field is blank or contain a value $\leq 18$, the PoKos application displays a new screen on the iPhone with an instruction that the user must be 18 or older, or her parent or guardian of legal age, to complete the registration process.

Remote processing server software (RPSS) correlates user's iPhone JID address, user name, password, age (and any other optional data also transmitted) with a new user account that the RPSS creates and maintains in a database on the RPS, for example a user book. RPSS checks the user-selected user name against third-party user names in the RPS User Book. If no there is no conflict, the remote processing server accepts the user name, establishes a new user account in the RPS User Book as a confirmed account, and stores that user's registration data in the RPS Book associated with that confirmed account. If there is a conflict, the RPS identifies other similar user names not associated with a third-party confirmed account in the RPS Book, by appending a numeric suffix to the requested user name, and transmits two or more such available appended names to the user's iPhone by sending the transmission to the JID associated with the user's iPhone. On the iPhone's PoKos registration page, user sees a message display that the requested user name is not available, and instructing the user to choose one of the suggested appended names, or type in a new user name all together. The user either selects an appended name, or types in a new user names, and then taps the okay button.

Parameters for Outbound Messages

The user can open either the PoKos App on the mobile node or her Profile/Settings on the PoKos website, and further tap/click on the tab message settings. In the message settings tab, the user can elect to limit the geographic and locational range of potential recipients of any outbound messages. This can be performed by typing into data fields on the settings page a specified distance and compass direction from her phone at the time she sends the message. The distance may be set in feet, fractions of a mile, or miles in some embodiments.

The compass direction may be set as an angle from the 'straight-ahead' direction that the phone is pointing at the time she sends the message. In some embodiments, the user's outbound message settings may include an actual compass heading, all compass headings within a specified range, or a combination of distance and direction(s). Rather than being a static instruction pre-set by the user and entered as data in a data field in the user's configurations/settings tab, this multi-directional/range capability can be deployed dynamically, as the user toggles between radius vs. directional messaging for a given message.

The user may change the distance and direction settings for each message, for a series of messages, or set it with a default setting for all messages. In some embodiments, users may be able to enter a postal zip code or address as well. Once the user selects the desired range(s) in distance and compass angle of the outbound message and types in the value(s) in the pertinent setting field(s), the setting can be saved and the message can be sent. The client application then stores the settings in memory 321 or in a database and transmits the range along with the message text when each message is sent.

The user can configure up to three aliases that can be used when sending messages. These aliases can be used as their handle when sending messages. The default handle is the PoKos ID they used when first registering. The user can enter a plurality of different aliases. When the aliases are entered and the user taps a submit button, the app transmits the aliases to the server. The server then performs the same steps as described in checking the user book to determine uniqueness among aliases. The current selected alias can be highlighted and used as the handle in public chat messages. The user can select a different alias to use or select none which will default to the user's name as their handle.

Parameters for Inbound Messages

In order to control the flow of inbound messages, the user can identify her preferences by either opening the client application on the mobile node or her Profile/Settings page on the PoKos website, respectively, and tap/click on the tab for message settings. A user can then elect, by pressing a "Block this Sender" button on the PoKos screen to block the current and future messages from the sender of the current message. Other options can also be provided such as buttons on the iPhone screen or web page, to block inbound messages from people or companies on her block list that she (now or previously) types into displayed data field on the screen or page. The client application can also enable 'whitelisting', so that a user may limit whom she receives messages from.

The whitelisting can include limits such as: (a) to receive inbound messages only from (1) pre-existing contacts in her phone's contact list; (2) people or companies on her approved lists that she (now or previously) types into displayed data fields on the iPhone screen or web page; (b) to receive inbound messages from people/companies located within a desired range. The user can also disable location services on the mobile node or disallow the client application from using location services to achieve a result similar to whitelisting because the user can be limited to sending and receiving IMs from people she already knows who are on her buddy list.

Once the user selects the desired controls for inbound messages, the client application then auto-transmits the inbound controls over the wireless network to the RPS. The RPSS then stores those controls in the User Book and the Service Book for the user name and JID associated with the user's mobile node.

Including Contacts and Identifying Buddies

A user can choose to maintain a list of her friends and recent contacts as buddies for frequent or current messaging using the client application by tapping on the "Friends" tab at the top (or the bottom) of the Buddy screen in the client application. Member can be added to the list by typing in the user name or Jabber ID of the friend from her mobile node contact list. If the existing contact of the user is already a registered service user, the client application detects that status of the identified contact, and auto-populates the user's buddy list with that contact's user name. If that existing contact is not a registered PoKos user, the user can choose to send that contact an invite (by SMS, email, or message on a social networking site such as Facebook) to download the client application and be added as a buddy of such user.

In certain embodiment, the user can type in the name or phone of a friend from her iPhone contact list. After receiving a process service message, or PSM, the recipient can choose to designate the PSM sender as a "buddy" by tapping on the buddy button at the bottom of a PSM. The client application can then auto-populates the recipient's buddy list with the PoKos username of such PSM sender. A user can choose to delete any PoKos username from her Buddy list by highlighting such buddy's name and tapping the radio button that says, "delete".

Creating an Outbound Message

The user may use the client application to do one or more of the following: (a) send private messages to people she already knows using a one-step process; (b) send private messages to people she doesn't know in a multi-step process; or (c) send a public message to people with the message range setting specified in step 3.1.4, either specifically for that message, or by reliance on the default settings for her outbound messages generally.

To send private messages to people she already knows, the user opens the client application on the mobile node and identifies these people. This can occur by using the buddy tab to select the buddy(ies) she wants to send a message to or by using the contacts app on her iPhone provide the contact's user name. This can be obtained by opening the name of the contact on the mobile node's phone book, highlighting the contact's IM address (i.e., JID), touching the highlighted IM address and selecting 'copy' from the pop-up choices displayed over the address (which copies the IM address on to the user's iPhone clipboard), and then reopening the client application to paste this information. This can be accomplished by touching the "To" field of the PoKos message, selecting "paste" from the pop-up windows displayed. The IM address can be used to auto-fill the "To" field. After identifying the people the user knows, the user types her message into the message field and sends the message.

Sending the Outbound Message

When the client application of a sending device first connects with the RPS, it establishes a persistent connection with the RPS using transmission control protocol (TCP) or XMPP, for example. The mobile node user's credentials such as username/password can be authenticated at the time of connection establishment. All subsequent messages are then transferred on this connection until the user logs out, after which the client application performs the login steps again to send additional messages.

RPS detects the JID and PoKos username of the intended recipients in the header of the message, stores that data in the service book, and re-directs the message to the devices associated with each of those JIDs. In order to send messages to people the user does not yet know, the user starts by tapping the tab labeled PoKos Chat in the open client application. From here the user can type in her message in the message field, select either to make her identity public or private and then hitting send. If the user wishes to keep her identify private then the handle by which the message is sent from can be one of her pre-configured aliases.

Processing the Outbound Message

The client application on the mobile node sends outbound messages over the wireless network to the RPS. Sometimes this sending can be an auto-transmission of the message. When the client application of a sending device first connects with the RPS, it establishes a persistent connection with the RPS and the user is authenticated. Subsequent messages are then transferred on this connection until the user logs out.

In preparing the message for transmission to other service users, the RPS detects from the message header the pertinent message range, direction, and/or other parameters, either chosen specifically by the sender for this message or stored in the service book as the default message range/direction for this user. The RPSS analyzes the location information in the service book for active registered devices and determines which active devices are within the message range/direction of the pending message, that is, which users are in-zone users. The RPS then logs and stores in a storage file called the message book in memory the messages sent during a persistent connection, including the identity of the sender and all recipient IZUs. In another embodiment, as an alternative or in addition to storage in RAM, the Message Book may be operated and maintained in a separate database in the RPS.

If the user has selected an alias in order to preserve her anonymity and privacy, RPS then uses the alias as the "from address" in the message sent to intended recipients. In some embodiments, the RPS may also preserve the privacy and anonymity through further processing of the message. This can include assigning distinct alphanumeric codes to each of the sender, the message, and the different in-zone users. A special code or tags can be added to the header of the pending message and stored in the Message Book associated with the pending message. The RPS can also delete the phone number, user name and any other identifying information (other than the Tags) from the pending message.

In the alternative, if the sender has elected to reveal her identity in this message, the RPS modifies the FROM portion of the message to combine both the original sending address and the user's PoKos username, with a tag to indicate this is a public chat message. A pending message processed by RPS can be referred to as a Process Service Message or PSM.

Third-Party Broadcast Messages

Creating a Broadcast Message

The RPS allows registered users to communicate using service messaging to targeted service user mobile nodes. The registered users can target both known and unknown service users by using certain criteria to select the service users. Users desiring to deploy Broadcast Messaging can gain access to the RPS, which can be implemented on specific server(s) or dedicated portions of servers, by visiting the PoKos website and providing their log-in credentials. A broadcast user procures log-in credentials either through electronic registration on the RPS or through registration offline directly with PoKos, for example. In either case, registration can include agreeing to the terms and conditions of Broadcast Messaging, such as content approval, timing, frequency, privacy, anti-spam, user controls, and/or other restrictions prescribed by license or otherwise.

A separate database of events, gatherings or activities at specific locations can be stored and updated on the Broadcast Servers or the RPS. After accessing the Broadcast Server, the Broadcaster selects or enters into the display fields various data about each Event, including Event name, street address, latitude and longitude of the Event location, start date/time and duration; the distance/range from the Event location to which the Broadcaster desires to send Broadcast Messages (i.e., a range broader than the geographic location of the Event itself); text, graphic and other content for Event messaging to be sent by each Broadcaster; time(s) for delivery of each Broadcast Message; and the name(s) of third-parties participating in the Event Broadcasts, such as venue owner, Event principal(s), Event host(s), and commercial and other sponsors. This information can be stored in a database, which can be referred to as a broadcast book. The broadcast book can further include the data in such fields, together with the additional fields as broadcast book entries. After completing the desired Broadcast Entries for each Event, the Broadcaster taps/clicks the "Okay" Button, and the Broadcast Software saves and stores the BB entries in the Broadcast Book The Broadcast Software The Broadcast Servers can include proprietary software that creates a graphical user interface that allows Broadcasters to type in their desired broadcast book entries into specified data fields, store the BB Entries in the Broadcast Book, and access BB Entries. In order to access the BB entries, the Broadcasters use their assigned log-in credentials to be authenticated. In other embodiments, the Broadcast Book also includes fields for the Broadcaster to add the Jabber IDs, phone numbers, and/or email addresses of mobile phone devices previously known or available to the Broadcaster or its agents, where the complete list of such devices can be referred to as a ListServ in some embodiments. To enable a Broadcast Message to be sent to a targeted group of mobile phone users relating to one or more Events, a Broadcaster using the Broadcast Software gains access to its Events in the Broadcast Book and enters the desired data in each BB Entry field.

The Broadcast Software prepares a customized message for each Broadcast message selected by the Broadcaster to be sent both to the ListServ and to PoKos users who are within the distance/range of the Event location specified by the Broadcaster in its BB entry for such event (such users herein, "In-Broadcast-Zone Users", or "IBZUs"). The Broadcast Software schedules and arranges for the form, timing, appearance and transmission of each Broadcast Message. It arranges for each message to be sent from the PoKos domain. The Broadcast Software arranges to include in the header of each message both (a) the PoKos domain, as the origin of the message (herein, the "PoKos Tag"), and the identity of the Broadcaster of each message (the "Broadcaster Tag").

The Broadcast Software arranges for each Broadcast Message to be auto-transmitted, at the date/time specified in the BB Entries for such Event, over the Wireless Networks to mobile devices on the ListServ and/or IBZUs specified in the BB Entries for such Event that have a registered PoKos App (all such devices herein "Broadcast Eligible Devices", or "BEDs"), except that no Broadcast Messages are sent to mobile devices (herein, "Broadcast-Blocked Devices", or "BBDs") whose preferences/settings in the User Book have been set to indicate their election not to receive PoKos messaging or Broadcast Messages for such Event and/or from such Broadcaster (the set of BEDs less BBDs, herein, "Targeted Broadcast Devices", or "TBDs"). The Broadcast Software arranges for the content and appearance of the Broadcast Message, as it will be displayed on the mobile node screen of each TBD, to be compiled, assembled and communicated to each TBD, using standard communication protocols (such as XMPP), so that such content and appearance are as desired, selected and approved by the Broadcaster Blocking a Broadcast Message PoKos users can at any time and from time to time (including at the beginning or in the midst of an Event) elect to block receipt of Broadcast Messages, either generally or from specific Broadcasters or relating to an Event(s), by (a) in respect of a specific Broadcast Message or alert listed on their PoKos Chat screen, by tapping on the Block tab; or (b) in respect of other messages, by tapping on the PoKos icon on their mobile node extended home screen; by tapping on the Settings tab; by taping on the commercial Tab; by typing in the desired restrictions in the pertinent data fields for time/date/location/venue/brand or Broadcaster identity; and by tapping the "Okay" button.

The PoKos App then auto-sends these commercial settings to the PoKos user over the Wireless Networks to the Broadcast Servers. The Broadcast Software then auto-enters and stores these commercial settings in a specific segment of the Service Book for Broadcast Messages and in the Broadcast Book as BBDs in accordance with such settings. Immediately prior to sending out each Broadcast Message, the Broadcast Software reviews the list of BEDs and compares against that list any and all BBDs whose commercial settings indicate a user preference not to receive such message, and after purging the BED list of such BBDs, compiles and maintains a list of remaining devices as TBDs.

Receiving a PSM or Broadcast Message

If they have the PoKos App installed and registered on their iPhone, IZUs and users of TBDs will receive in real-time all PSMs sent from the RPS. If they have the PoKos App open and active on their iPhone, IZUs and users of TBDs will receive in real-time all Broadcast Messages sent from the RPS. When they tap on the PoKos icon on their iPhone extended home screen, In-Zone Users will receive any and all pending PSMs, and users of TBDs (TBDUs) will receive any and all pending Broadcast Messages that have been sent to their current location when they were offline and for which such Broadcast Messages are still active. These will display on the PoKos Chat tab of the PoKos App in the same order in which the RPS sent them.

PoKos will display the first line of each unopened PSM and the user name of the PSM sender; and the first line of each Broadcast Message and the Broadcaster Tag of such message. By tapping on the PSM, the recipient can open and read the entire message. By tapping on the ignore or block buttons at the bottom of the PSM, the recipient can choose to ignore this message or block future messages from this sender. A recipient can similarly choose to block or ignore a Broadcast Message, but cannot reply to a Broadcast Message. By tapping on the reply button at the bottom of the PSM, the recipient can choose to reply to all IZUs in a public chat reply, while maintaining her anonymity, just as if she is sending a new public chat message. By tapping on the message itself, the recipient can choose to reply in a private message only to the PSM sender, while retaining her anonymity, by sending from the current active alias or, if she elects not to hide her identity, by sending the reply with a message from her username.

If the sender of the PSM has sent the message using her PoKos username, by tapping on the buddy button at the bottom of a PSM, the recipient can choose to designate the PSM sender as a "buddy". The PoKos App auto-populates the recipient's buddy list with the PoKos username of such PSM sender. By touching and highlighting a Buddy name on the Buddy Tab after receiving a PSM, a user can: (a) Send a private message to the Buddy by touching the radio button that reads, "Send a Message"; or (b) delete that Buddy from her Buddy list by tapping the radio button that reads, "Delete".

If the recipient has chosen to reply to a PSM in either a public chat or a private message, she types in her message in the reply data field, and then taps the send button. The PoKos App will process the pertinent data executing the reply and/or instructions given by the message recipient, and then auto-transmits over the wireless networks such reply/instruction to the PoKos RPS.

RPSS at the PoKos RPS first sorts any instructions in the reply message or instruction; stores ignore and/or block requests in the Message Book or Broadcast Book, as the case may be, and in the Service Book, with appropriate cross-references to the user name and MAC address both of the original sender and of the recipient giving the ignore or block request; and separately records in the Message Book or Broadcast Book any public chat or private message reply of the recipient. If the recipient has selected a public chat reply, the RPSS treats the reply as a processed service message. If the recipient has chosen a private message reply, the RPSS transmits the PM over the Wireless networks to the original sender's iPhone device.

In the event that other IZUs receiving the original sender's first PSM want to respond by public chat or private message, or the original sender receiving the first recipient's reply by public message, want to further respond by public chat or private message, each or all of them may do so, by repeating the steps above. In the event that any IZU receives a private message from another IZU, she can reply by private message by tapping the reply button, typing her message in the reply data field, and tapping the "send" button. The PoKos App then auto-transmits over the Wireless Networks the reply and/or instructions of this further message to the PoKos RPS Marketing and Sales Functionality For marketing and sales purposes and applications, a client application and the remote processing server can distribute marketing communications and other promotions to mobile nodes and other devices of targeted known and unknown participants. The client application can provide users with redemption and purchasing capabilities deployed on the mobile node or other device to purchase goods and services. This feature can be used where a business that is sponsoring an event wants to target its marketing messages to induce people in a specified region or with identified interests to attend the sponsored event and to purchase that business' products. The client application and remote processing server can contact both known and unknown people to advertise the event, provide promotions to these people to encourage participation, and allow redemption of coupons and purchasing of the sponsoring business' products through the system.

In order to provide these services a marketing client application can be deployed on a mobile node or other device such as a computer. In some embodiments, the client application can include these features for service users and sponsors can use a portal or web login to engage in marketing and sales messaging. The remote processing server can also be modified to provide these capabilities. A marketer can send a service message such as a communication PSM containing promotional and other marketing material (marketing service message) to targeted in-zone devices and/or group member devices that are registered with the service by active service users. The marketing client application can be used along with the remote processing server or ad server to send a marketing service message to targeted unknown people possessing a mobile node that is included in the database of the remote processing server. The remote processing server directs such marketing service messages to recipient mobile nodes and other devices based on the remote processing server's detection, retrieval and analysis of GPS data, filter data, and/or other identifying information of each recipient device. The information can be compiled using the active discovery or passive discovery along with register described herein. The identifying information can include the recipient device's IP address and/or MAC address.

In some embodiments, the sponsor user may also elect to use filters to direct an outbound message to a targeted group of users. Filters can be provided on the remote processing server to select a subset of users to target for delivery of a message. Using filters, the sponsor may identify attributes of the users to whom they desire to send the message. The filters are used to exclude matches based on other data that is associated with a user. This data can be received by the user during the registration process, for example, or learned based on the actions of the user. For example, a user expressing certain interests based on their participation in certain events or providing information can associate data with their identity information. This information can be classified into attributes about the user that are used to classify various users. These attributes may include professional, associational, personal, physical, social, athletic, recreational, hobby and/or other characteristics.

The client application can receive marketing service messages from the remote processing server. The remote processing server can send the marketing service messages to the recipient devices of a target audience designated by the marketer. The client application can receive these marketing service messages in a variety of ways, some of which can be set by the user in the preferences of the client application. The options include (i) receiving the marketing service message as a traditional text (or other inbound electronic communication, such as via e-mail), and displaying the content of such marketing service message on the mobile node as a displayed message; (ii) alerting the user that a marketing service message has been received; or (iii) choosing from one of the other PSM response options, including ignoring the sender and the current promotion or other marketing service messages; or blocking the marketer and future promotions and/or other marketing service messages from such marketer, other callers or even all callers sending promotions and/or other marketing service messages. In each case, the marketing client application and the remote processing server can send marketing service messages as tagged messages, featuring a specific handle for the marketer or as a public message, depending on the preferences of the sender.

A marketing service message that is opened by a user can be displayed on a recipient device as a static, highlighted, flashing, or other conspicuous icon, logo, picture, text or other means, and in the case of multiple coupons or promotions, could include a number, letter, percentage discount, or other means to designate the number, value or other measure of the coupon or promotion depending on the preferences of the sender. The client application allows a recipient to redeem a coupon promotion, or secure the benefit of any other promotion, by displaying on the mobile node the featured promotion icon, symbol or text. The user can then present this to a merchant representative or request the redemption of the featured promotion by selecting the icon for the featured promotion on the display of the user's mobile node. The client application can track the user's interaction with the promotion including when and where the promotion was open and used. This tracking information can be recorded on the mobile node and/or sent in a service message to the remote processing server, to the marketer directly, or to another server, such as the ad server. This tracking information can also be used to determine when a promotion has been redeemed by a recipient so that the promotion is cannot be redeemed outside of the marketer's preferences. For example, a single use promotion cannot be redeemed multiple times.

A record of the number of featured promotions redeemed by each targeted recipient, together with the balance, if any, of such featured promotions available to each targeted recipient can be maintained on a server such as remote processing server, the marketer's server, or the ad server. The server can use this promotion balance information to send a service message to the device of the targeted recipient, confirming the balance of the featured promotions available to such targeted recipient. The client application can remove the promotion once the promotion has been used. In some embodiments, the promotion balance can be maintained locally on the client application and a confirmation service message can be sent from the mobile node to the server to reconcile the balance and ensure the user is not attempting to redeem more than the specified number of times.

In some embodiments, the client application in conjunction with the remote processing server can be used to purchase a product or service from a merchant, vendor or marketer maintaining an account on the remote processing server. The purchase can occur by accessing the seller's website or by opening a marketing service message and then by selecting an icon or other representation on the mobile node to designate the item and quantity being purchased. The client application can track the user's interaction with the product or service, record information about the interaction, and send a report regarding the interaction in a service message to a server, such as the remote processing server. The server can then use this information about the interaction to determine the total amount due for the purchased items (net of any promotions or other credits), and send a service message to mobile node to display through the client application to the service user. The user can authorize payment through the mobile node or the client application running on the mobile node. The payment authorization can include pressing a button or other icon to pay for and complete the purchase of the purchased items from the mobile node.

Figure 13:
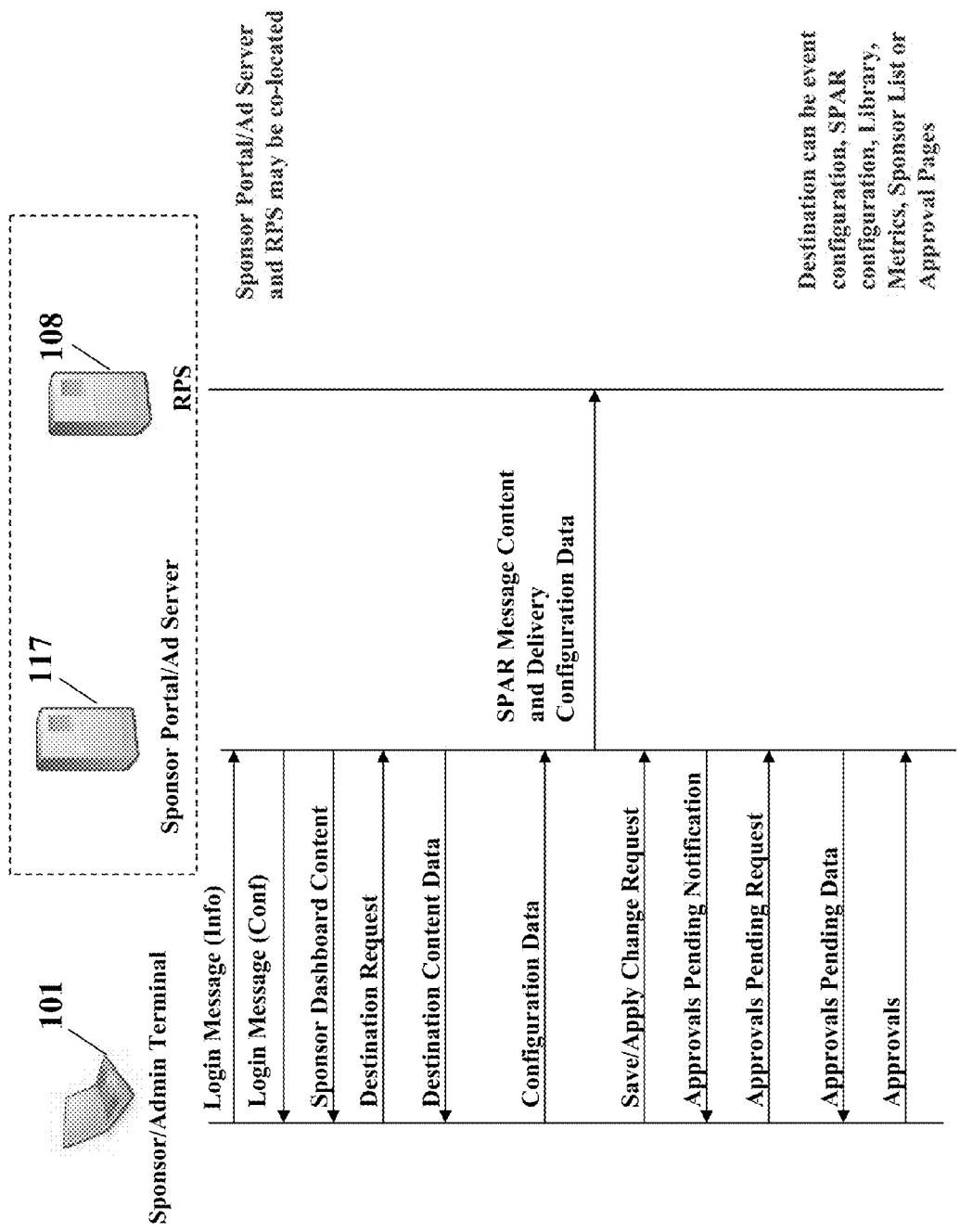
FIG. 13 illustrates a messaging diagram illustrating a marketing and sales function in accordance with certain embodiments.
Figure 14:
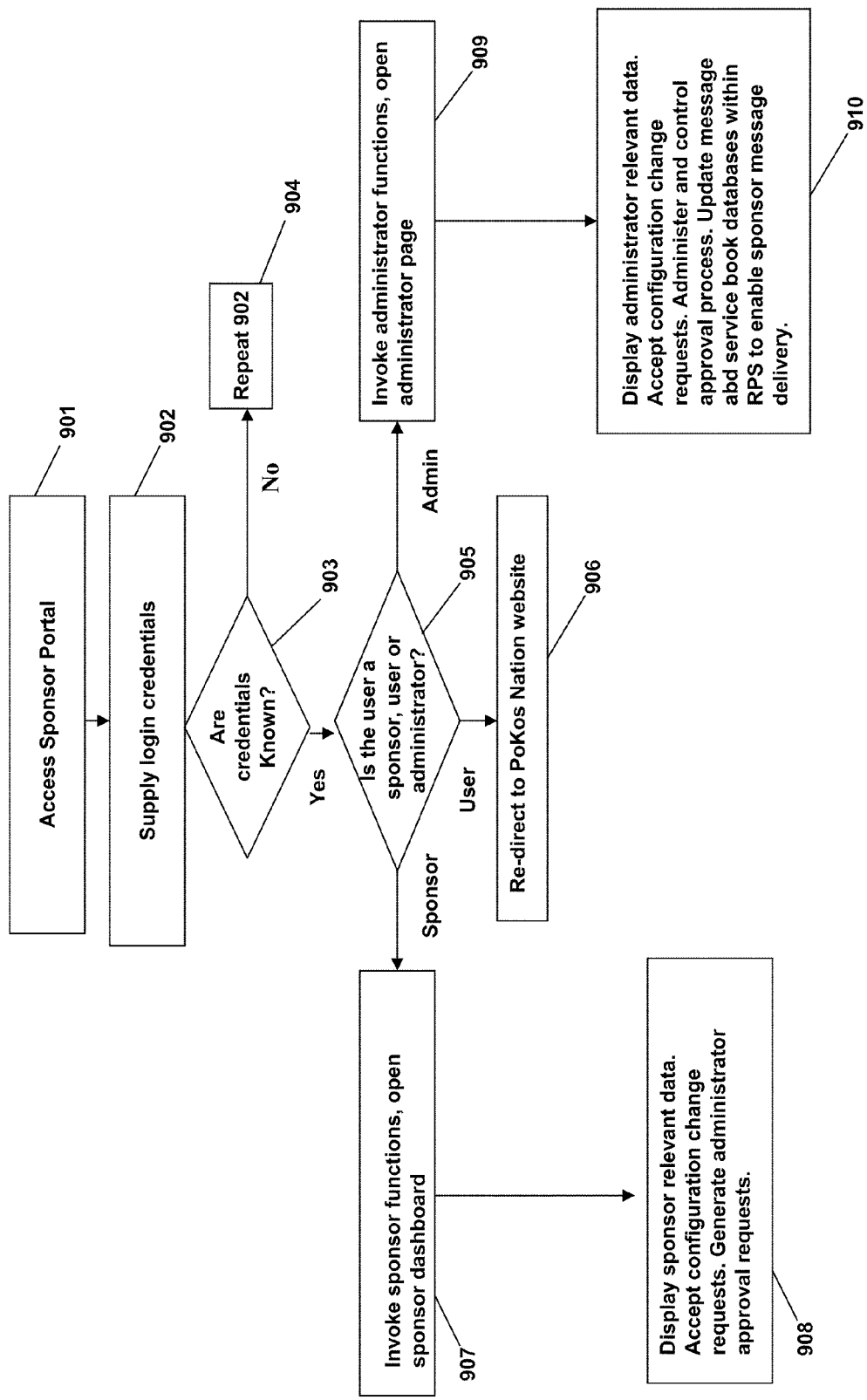
FIG. 14 illustrates a process flow of target marketing in accordance with certain embodiments.

FIG. 13 illustrates a messaging diagram illustrating a marketing and sales function in accordance with certain embodiments. FIG. 13 includes a sponsor/administrator terminal 101, a sponsor portal/ad server 117, and a remote processing server 108. As indicated with the line, in some embodiments server 117 and remote content server 108 can be implemented on the same server or co-located in the same geographical area. FIG. 13 illustrates messaging between sponsor/administrator terminal 101 and sponsor portal/ad server 117 as well as between sponsor portal/ad server 117 and remote processing server 108. FIG. 14 illustrates a process flow of target marketing in accordance with certain embodiments.

Sponsor Bar (SPAR) Function and Communication Mechanism

In some embodiments, a broadcast message from a commercial sponsor or advertising client can be designated a SPAR message. The SPAR can be a dedicated field on the client application user interface where commercial advertisements and promotions are displayed. A SPAR message can be transmitted to one or more mobile nodes registered with the remote processing server. The remote processing server sends the SPAR message based on whether a mobile node meets certain target criteria. If a mobile node meets this criteria, the remote processing server populates the SPAR message with text and/or graphics as specified by the SPAR configuration page. Tapping an active SPAR message on the SPAR may cause further information related to the advertisement or promotion to be displayed as in conjunction with a SPAR message. SPAR messages can be treated as Third-Party Broadcast Messages with communication the messages proceeding as describe above.

A portal can provide certain users (sponsors and administrators) the ability to configure messages and any associated content as well as view information relating to the delivery to and responses from users. The portal can be reached by invoking internet browser application on any device with internet browsing capabilities such as a laptop, desktop or smartphone. For example, a user can access the sponsor portal by entering the URL for the sponsor portal into the browser or accessing the PoKos home page by entering www.pokos.biz into the browser and then clicking the sponsor portal icon. This provides the user a login page from which the user can log in to the remote processing server. The login page requests identification credentials from the user such as a login name and password. The RPS receives the user credential and resolves the user to of the following categories of users: unknown, sponsor, administrator, or user.

If user credentials resolve to "unknown" or an invalid password is supplied for a known user name RPS informs user that the login/password combination is invalid and prompts user to re-enter. A "forgot my password" link can be provided that when selected presents the user with a screen to enter their email address. After receiving an email address, password reset instructions are transmitted to that email address. If user credentials resolve to "sponsor," then the RPS invokes the sponsor functions and the user is taken to the sponsor dashboard page. If user credentials resolve to "administrator", then the RPS invokes the administrator functions and the user is taken to the administrator page. If user credentials resolve to "user", then the RPS redirects the user to the PoKos Nation website.

The RPS can send information through the portal interface to the user. This information is displayed in the browser where the user can interact with the information and make selections. The information displayed can include a number of types of information such as sponsor information, event information, SPAR information, a library, and metric information. Sponsor information such sponsor name, account number, current status, and contact information can be displayed. An event list can be displayed that shows sponsor's event names, dates, approval status (pending/approved/denied) and past/present/future. Additional information can be displayed on a per event basis with event configuration page being generated by the RPS for each event selected by the user.

The RPS can display an event name, start date and time, end date and time, location of event, broadcast notification location, approval status (pending/approved/denied) and list of SPARS assigned to the event. The locations can include a latitude, longitude and radius. The user is given options to add SPARS to the event and to save/apply or cancel changes. User clicks on a SPAR in the SPAR list. RPS displays SPAR configuration page for that SPAR. User clicks on the "add SPAR" link. RPS displays user's SPAR list. User selects one or more SPARS from SPAR list. RPS checks for location, date and time consistency between event and SPAR. If the event and SPAR are consistent RPS adds SPAR to SPAR list for event. User clicks on save/apply changes. RPS returns user to sponsor dashboard.

If the event and SPAR are not consistent RPS displays user a warning message requiring a cancel or accept response. User clicks on cancel changes. RPS returns user to sponsor dashboard page. For current or passed events, a link can be provided to take the user to the relevant metrics page for that event. A SPAR list can be displayed that shows sponsor's SPAR names, dates, approval status (pending/approved/denied) and past/present/future. The user can be given an option to add new SPAR. The can be done through a SPAR configuration page for that SPAR, which allows the user to specify the SPAR.

RPS displays fields for SPAR name, text, image, spar configuration, location consisting of latitude, longitude and radius, start date and time and end date and time. User is given option to save/apply or cancel changes. User may enter or edit the name of the SPAR, or the text associated with the SPAR. User may insert or replace the image associated with the SPAR. User may enter or edit the text and insert or replace the image associated with the sparcon of the SPAR if used. User may enter or edit the location of the SPAR (latitude, longitude and radius). User may enter or edit the date, start time and end time of the SPAR. Clicking on an event name will take the user to the event configuration page. User clicks on save/apply changes, or user clicks cancel changes. RPS returns user to sponsor dashboard page. For each approved SPAR, a link will be provided to take the user to the relevant metrics page for that SPAR. The "sparcon" can be a larger (full screen) promotional message or coupon that pops up when the client taps the appropriate SPAR. RPS displays a list of events that the SPAR is assigned to and the approval status (pending/approved/denied). This data cannot be edited by user.

A library page with sponsor resources can be provided through the portal. The library stores all data, text or graphics that the sponsor wishes to have associated with their accounts to be used in events and/or SPARs. A list of all images is displayed with thumbnails of the image and their approval state. Clicking on a thumbnail will cause the full image to be displayed. All text elements are displayed listing the full text. The current approval status of each element is displayed. Each element may be modified or deleted. Modifying an element will allow a new graphic to be uploaded or new text to be entered. User clicks on save/apply changes.

User may cancel the changes by clicking on cancel changes. Changes are removed and user is taken to the main library screen. Text and graphics elements may be added. User clicks on "add new graphic". A dialog box is displayed which allows the user to browse to a file on their local file system and upload the desired image. User clicks on "add new text". A text box is displayed which allows the user to enter new text. Any change, or new graphics or text is placed in the pending state and follows the approval process.

A metrics page that displays sponsor metrics can also be provided through the portal. Metrics are presented for all currently active or past SPARs and Events. Each current or past event is listed. Selecting an event brings up the metrics for that event and shall contain a chat log of all chat that occurred as part of the event, controls to view and participate in the live event chat, current number of participants and number of participants who have left the event. Each current or past SPAR is listed. Selecting a SPAR brings up the metrics for that SPAR and shall contain, per geographic area, the number of times the SPAR was displayed on a device and the number of times the SPAR was selected to display the SPAR message.

When new information is entered into the Sponsor Portal the content is saved in the database. RPS sets the content state to "pending". RPS sends a notification via email to PoKos administrators that new content is awaiting approval. PoKos administrators follow the approval process.

An administrator has full edit ability to all sponsor fields. Information entered by an administrator is automatically saved in the approved state. Administrator page displays the sponsor list link. Administrator clicks on the sponsor list link and is taken to the sponsor list. Sponsor list displays all registered sponsors. Administrator clicks on a sponsor and is taken to the sponsor dashboard page. Sponsor list displays buttons to add and remove sponsors. Administrator clicks add sponsor and is taken to a blank sponsor dashboard. Administrator selects a sponsor and clicks remove sponsor. A confirmation screen and warning is displayed. When administrator provides a positive response to the confirmation warning the sponsor is removed from the sponsor list. All data associated with the sponsor including library, events and SPARs is removed from the database Administrator clicks on the event list link and is taken to the event list. Event list displays all registered events and associated sponsors. Administrator clicks on an event and is taken to the event configuration page for that event. Event list displays buttons to add and remove events. Administrator clicks add event and is taken to a blank event configuration page for that event. Administrator selects an event and clicks remove event. After Administrator provides positive response to confirmation message the event is removed from the event list.

Administrator clicks on the SPAR message list link and is taken to the SPAR message list. SPAR message list displays all registered SPAR messages and associated sponsors. Administrator clicks on a SPAR message and is taken to the SPAR Configuration page for that SPAR message. SPAR message list displays buttons to add and remove SPAR messages. Administrator clicks add SPAR message and is taken to a blank SPAR configuration page for that SPAR message. Administrator selects a SPAR message and clicks remove SPAR message. After Administrator provides positive response to confirmation message the SPAR message is removed from the SPAR message list.

Administrator clicks on the approval pending link and is taken to the approvals pending list. The approvals pending list contains the list of all events and SPAR messages that sponsors have changed and left in the pending state along with options for the administrator to approve or reject the changes. Approval results in the event or SPAR message state changing to approved and an email to that effect being sent to the sponsor. Rejection results in the event or SPAR message state changing to rejected and an email to that effect being sent to the sponsor.

In some embodiments, the disclosed communication methods enable a number of new wireless and other device communication methods, through (1) new processes to detect unknown people and unknown wireless and other devices with attributes lying within specified parameters, (2) new processes to enable a wireless device user and others to direct a targeted message or other communication to the users of such unknown wireless and other devices, (3) new processes to assure the relative privacy of the messages and communications, (4) new processes to assure an expected privacy level of the devices, (5) new processes to assure expected anonymity of the device users of both the outbound and inbound messages and communications, (6) through the combination of such processes and other processes, a new process to enable, control and manage enable directed targeted two-way communications from, between and among unknown people and unknown devices temporarily, frequently or regularly in a certain location or different locations, and/or between or over selectable and variable distances (or even without regard to distance), and roaming communications between such people and devices as they move between locations, (7) through the combination of such processes, a new process to enable outbound communications from and to wireless and other devices that are directed in real-time to unknown people and sent beyond one or more known fixed endpoints, i.e., to specifically include one or more unknown devices, (8)

through the combination of such processes, a new process to enable real-time direct and targeted communications among wireless and other devices beyond one or more known fixed endpoints, and (9) through the combination of such processes, to launch a new era of social messaging, wireless communications, and telecommunications that brings people together in person, rather than the predominant isolating consequences of traditional social media and electronic communications and networks.

In some embodiments, methods and systems enable new marketing and sales methods to and from wireless and other devices, through: (10) targeted marketing to known people and devices, (11) through the combination of processes referenced in steps 1-10 above, targeted marketing to unknown people and unknown devices located within specified geographic ranges and distances, and/or to devices whose holders possess other attributes selected by the user (such unknown people and unknown devices, together with known people and devices referenced in step 10 above, jointly herein, a "Target Audience"), (12) through the combination of such processes, the distribution to a Target Audience of promotions, including coupons and other marketing measures designed to stimulate demand (jointly herein "Promotions"), (13) a new method for people to redeem Promotions, (14) together with the process referenced in the preceding step 13, a new method for people to purchase a product or service, (15) through the combination of one or more of such processes, a new method (herein, "Mobile-Screen Redemptions") for the Target Audience to redeem Promotions via wireless and other devices, and (16) through the combination of such processes, a new method (herein, "Mobile-Screen Purchases") to stimulate and enable sales procurement from and by users of wireless and other devices (the methods and processes referenced in steps 10-16 above collectively herein "Marketing Methods")

These embodiments enable a user to target marketing and sales programs, processes and techniques to people and devices (both unknown and known) located within specified geographic ranges and distances, and/or to devices whose holders possess other attributes selected by the user. In some embodiments, mobile, wireless and other devices communicate where neither the device originating the communication (a "Sending Device") nor its user (jointly with the Sending Device, a "Sender") possesses or knows the phone number, email address, instant messaging screen name, alias or other contact information (such phone number, etc., herein, "Contact Information") of the specific intended recipient device(s) (a "Recipient Device" or "Recipient Devices") or its user (jointly with a Recipient Device, a "Recipient" or "Recipients"). The communication may not be dependent upon the Sender's or Recipient's membership in or use of a pre-existing or ad hoc electronic or digital: group, community or network; blog, micro-blog, or bulletin board; or single or multi-media data feed. Sender and Receiver each can elect the desired level of privacy and anonymity for their communications.

In certain embodiments, the Sender can identify the specific Recipient using one or more intended attributes, such as individuals or devices that it can see, detect or identify, contain or are associated with a specific unique device identifier, unique software or firmware identifier code, internet protocol address or domain information, machine access control address, are located at a specific geographic location, are located within a given range and/or bearing of a specific geographic location, are located in a specific or general geographic location, region or area, possess or contain certain professional, associational, personal, physical, social, athletic, recreational, hobby and/or other interests and attributes, and/or possess or contain two or more of these Recipient identifying codes. Further, the method and system can include where devices can engage in real-time in direct and targeted communications beyond one or more known fixed endpoints, without regard to or limitation by static or dynamic location or attribute of either Sender or Recipient.

In addition, the method and system can include where Sender and Recipient can select and assure the relative and/or expected privacy and anonymity of their communications. Further, the method and system can include where a Sender can communicate directly with a Recipient whom she can see but does not know. In addition, the method and system can include where a Sender can point her device at an intended Recipient and communicate directly and privately with that Recipient, without use of the Recipient's Contact Information. Further, the method and system can include where communications among Sender and Recipient(s) previously unknown to each other bring people together in person. Further, the method and system can include where an entity or person provides, arranges to provide, sells or distributes such communications as a product or service or as part of a product or service.

In some embodiments, the method and system can include where a Sender can broadcast, stream, transmit, distribute, send, or otherwise make available for access or download (jointly herein, "Broadcast") to or by a Recipient data, music, video, and/or multimedia files and content. Additionally, the method and system of can include where a Sender can Broadcast news, entertainment, educational and informational materials, business and scientific material and other data, and other content of any and every kind or description, to a Recipient or groups of Recipients without use of the Recipient's Contact Information. Further, the method and system can include where an entity or person provides, arranges to provide, sells or distributes such Broadcasts as a product or service or as part of a product or service. In addition, the method and system can include where a Sender can direct targeted marketing communications to known people and devices ("Known Recipients"). Further, the method and system of can include where a Sender can direct targeted marketing to unknown Recipients ("Unknown Recipients"). In addition, the method and system of can include where a Sender can send and distribute to Known Recipients and/or Unknown Recipients (jointly herein, a "Target Audience") promotions, including coupons and other marketing measures designed to stimulate demand (jointly herein "Promotions"). Further, the method and system of can include where a Sender can provide/furnish a new method for a Target Audience to redeem Promotions.

In addition, the method and system can include where a Sender can provide/furnish a new method for a Target Audience to purchase products or services from the Sender. Additionally, the method and system can include where a Sender can provide/furnish a new method for a Target Audience to redeem Promotions via mobile, wireless and other devices. Further, the method and system can include where a Sender can provide/furnish a new method to stimulate demand and enable sales procurement from and by a Target Audience. Additionally, the method and system can include where an entity or person provides, arranges to provide, sells or distributes such communications, broadcasts, redemptions, purchasing and procurement, and/or marketing and demand stimulation as a product or service or as part of a product or service.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the remote processing server can be co-located with a device.

We claim:

1. A method of selectively communicating with one or more other devices whose identification information is unknown, the method comprising:

launching a client application on a device (the "sending device"), wherein the client application enables communication with other devices whose identification information is unknown;

locating other devices in a geographical zone defined with reference to the sending device;

obtaining identification information regarding the other devices located in the defined geographical zone;

compiling the identification information regarding the other devices located in the defined geographical zone to enable selection of at least one device to initiate communication using service messages;

displaying a selection of the at least one device from the compiled identification information of the other devices located in the defined geographical zone;

enabling privacy preferences for the sending device, wherein the privacy preferences enable the device to send variable identification information to the at least one other device;

enabling the client application on the sending device to specify whether a service message is a private service message, wherein the private service message is accessible only to the at least one other device; and sending the message from the sending device and delivering it, using such variable identification information, to the at least one other device (herein, the 'recipient device'), where either of the following conditions is also satisfied:

(a) the contact information (e.g., email address; IM screen name; social media or Internet screen name, handle, alias, or avatar; phone number; MAC address; IP address) (collectively herein "Contact Information") of the recipient device is not previously known to any of: the sending device, its users, or any business, social or communications network to which the sending device or any of its users is a member; or (b) the service message is delivered from the sending device using such variable identification information, and without using email, instant messaging (IM), text messaging, telephony or any other communications protocol or technique based on fixed endpoints where any of such Contact Information is known to any of: the sending device, any of its users, or any business, social or communications network of which the sending device or any of its users is a member.

2. The method of claim 1, further comprising:

communicating with a remote processing server ('server') from the sending device to locate the other devices within the defined geographical zone based on at least one of location coordinates of the device procured from location-technologies such as the global positioning system (GPS), cellular telephone towers, and mobile-location technologies; geographic location (e.g., physical street address; postal code; neighborhood or community; building or business name; local, state or province, regional, national, continental, trans-national or global area); topographical data (e.g., height relative to sea-level); and directional and spatial data (e.g., compass and three-dimensional directional bearings), as procured from active memory, other client applications or databases on the such other devices;

receiving information regarding the other devices located in the defined geographical zone from the server; and sending the service message to the server, which sends the service message to the selected at least one other device.

3. The method of claim 1, further comprising:

detecting, at the client application on the first device, a search by a second client application on a second device;

sending from the client application on the first device to the second client variable identification information comprising at least one of direction, location, unique device identification number or identifier, device serial number, software ID, firmware ID, user name or identifier code, one or more attributes of a user of the sending device (such as at least one of the user's professional, associational, personal, physical, social, athletic, recreational, hobby and other interests and attributes), or any other data associated with the device or its user, that the second client application compiles; and receiving a message from the second device.

4. The method of claim 1, further comprising receiving at the client application of at least one device at least one targeted marketing or other promotional message based on variable identification information, wherein the identification information comprises at least one of direction, location, unique device identification number or identifier, device serial number, software ID, firmware ID, user name or identifier code, one or more attributes of a user of the device, or any other data associated with the device or its user.

5. A method of selectively communicating with one or more other devices whose identification information is unknown, the method comprising:

launching a client application on a device ('sending device'), wherein the client application enables communication with other devices whose identification information is unknown;

identifying other devices based on selected criteria specified in the client application;

receiving information regarding the other devices possessing the selected criteria;

compiling the information regarding the other devices possessing the selected criteria;

displaying a selection from the compiled information of at least one other device possessing the selected criteria;

enabling privacy preferences for the sending device, wherein the privacy preferences enable the device to provide variable identification information to the at least one other device;

enabling the client application on the sending device to specify whether a message is a private message, wherein the private message is accessible only to the selected at least one other device; and sending the message from the device to the at least one other device, using sending the service message from the sending device and delivering it, using variable identification information, to the at least one other device (herein, the 'recipient device'), where either of the following conditions is also satisfied:

(a) the contact information (e.g., email address; IM screen name; social media or Internet screen name, handle, alias, or avatar; phone number; MAC address; IP address) (collectively herein "Contact Information") of the recipient device is not previously known to any of: the sending device, its users, or any business. social or communications network to which the sending device or any of its users is a member; or (b) the service message is delivered from the sending device using such variable identification information, and without using email, instant messaging (IM), text messaging, telephony or any other communications protocol or technique based on fixed endpoints where any of such Contact Information is known to any of: the sending device, any of its users, or any business, social or communications network of which the sending device or any of its users is a member.

6. The method of claim 5, wherein the device is at least one of a mobile phone, a landline phone, a computer, an Internet protocol enabled phone, a broadcast or cable-enabled television, an Internet enabled television, and a video game system, wherein the client application is implemented in at least one of hardware, firmware, and software, and wherein variable identification information comprises default, specified or random criteria, such as at least one of direction, location, unique device identification number or identifier, device serial number, software ID, firmware ID, user name or identifier code, one or more attributes of a user of the device (such as at least one of the user's professional, associational, personal, physical, social, athletic, recreational, hobby and other interests and attributes), or any other data associated with the device or its user.

7. The method of claim 5, further comprising:
communicating with a remote processing server from the client application to identify the other devices based on selected criteria, wherein the selected criteria comprises location information comprising a geographical zone defined with reference to the device, wherein the defined geographical zone is based on at least one of location coordinates of the device procured from location-technologies such as the global positioning system (GPS), cellular telephone towers, and mobile-location technologies; geographic location (e.g., physical street address; postal code; neighborhood or community; building or business name; local, state or province, regional, national, continental, trans-national or global area); topographical data (e.g., height relative to sea-level); and directional and spatial data (e.g., compass and three-dimensional directional bearings), as procured from active memory, other client applications or databases on the such other devices;
receiving information regarding the other devices located in the defined geographical zone from the remote processing server; and
sending the message to the remote processing server, which sends the message to the selected at least one other device.

8. The method of claim 5, wherein identifying by the client application is performed using cellular, Bluetooth, infrared, Near-Field Communications (NFC), Wi-Fi technologies and other communications protocols supported by the device, and wherein the message is transmitted using at least one of Bluetooth, infrared, NFC, Wi-Fi, cellular technologies and other communications protocols supported by the device.

9. The method of claim 5, further comprising: detecting, at the client application on the first device, a search by a second client application on a second device;
sending from the client application on the first device to the second client application variable identification information comprised of default, specified or random criteria, such at least one of direction, location, unique device identification number or identifier, device serial number, software ID, firmware ID, user name or identifier code, one or more attributes of a user of the sending device (such as at least one of the user's professional, associational, personal, physical, social, athletic, recreational, hobby, and other interests and attributes), or any other data associated with the device or its user, that the second client application compiles; and
receiving a message from the second device.

10. The method of claim 5, wherein the message comprises at least one of message settings, message information, and content information, and wherein the content information comprises at least one of voice, text, image, data, and video.

11. The method of claim 5, further comprising receiving at the client application at least one targeted marketing or other promotional message based on client application information, wherein the client application is implemented in at least one of hardware, firmware, and software, and wherein variable identification information comprises default, specified or random criteria, such as at least one of direction, location, unique device identification number or identifier, device serial number, software ID, firmware ID, user name or identifier code, one or more attributes of a user of the device (such as at least one of the user's professional, associational, personal, physical, social, athletic, recreational, hobby and other interests and attributes), or any other data associated with the device or its user.

12. The method of claim 11, wherein the at least one targeted marketing or other promotional message comprises a promotion that is accessible or redeemable using the client application.

13. A device for selectively communicating with one or more other devices whose identification information is unknown, the device comprising:
an interface that is configured to communicate with the one or more other devices;
a client application that is configured to communicate with the interface to search for at least one of the one or more other devices based on selected criteria specified in the client application and to compile information obtained from the one or more other devices;
such client application further configured to send a message to one or more other devices selected from the compiled information, and to enable privacy preferences for the device, wherein the privacy preferences enable the device to provide variable identification information to the at least one other device as well as to enable the client application to specify whether a message is a private message, wherein the private message is accessible only to the selected at least one other device; and
such client application is further configured to deliver such messages, using variable identification information, to the at least one other device (herein, the 'recipient device'), where either of the following conditions is also satisfied:

(a) the contact information (e.g., email address; IM screen name; social media or Internet screen name, handle, alias, or avatar; phone number; MAC address; IP address) (collectively herein "Contact Information") of the recipient device is not previously known to any of: the sending device, its users, or any business, social or communications network to which the sending device or any of its users is a member; or (b) the service message is delivered from the sending device using such variable identification information, and without using email, instant messaging (IM), text messaging, telephony or any other communications protocol or technique based on fixed endpoints where any of such Contact Information is known to any of: the sending device, any of its users, or any business, social or communications network of which the sending device or any of its users is a member.

14. The device of claim 13, wherein the device is at least one of a mobile phone, a landline phone, a computer, an Internet protocol enabled phone, an Internet enabled television, and a video game system, wherein the client application is implemented in at least one of hardware, firmware, and software, and wherein variable identification information comprises default, specified or random criteria, such as at least one of direction, location, unique device identification number or identifier, device serial number, software ID, firmware ID, user name or identifier code, one or more attributes of a user of the device (such as at least one of the user's professional, associational, personal, physical, social, athletic, recreational, hobby and other interests and attributes), or any other data associated with the device or its user.

15. The device of claim 13, wherein the interface is configured to communicate with a remote processing server that searches for other devices based on selected criteria, wherein
the selected criteria comprises location information comprising a geographical zone defined with to the first device, wherein the defined geographical zone is based on at least one of location coordinates of the device procured from location-technologies such as the global positioning system (GPS), cellular telephone towers, and mobile-location technologies; geographic location (e.g., physical street address; postal code; neighborhood or community; building or business name; local, state or province, regional, national, continental, trans-national or global area); topographical data (e.g., height relative to sea-level); and directional and spatial data (e.g., compass and three-dimensional directional bearings), as procured from active memory, other client applications or databases on the such other devices.

16. The device of claim 13, wherein the interface is configured to search and communicate using at least one of cellular, Bluetooth, infrared, Near-Field Communications (NFC), Wi-Fi technologies and other communications protocols supported by the device.

17. The device of claim 13, wherein the client application is configured to detect a search by a second client application on a second device, and send to the second client application information comprised of default, specified or random criteria, such as at least one of direction, location, unique device identification number or identifier, device serial number, software ID, firmware ID, user name or identifier code, one or more attributes of a user of the first device (such as at least one of the user's professional, associational, personal, physical, social, athletic, recreational, hobby and other interests and attributes), or any other data associated with the device or its user.

18. The device of claim 13, wherein the message comprises at least one of message settings, message information, and content information, and wherein the content information comprises at least one of voice, text, image, data, and video.

19. The device of claim 13, wherein the client application is configured to receive at least one targeted marketing or other promotional message based on information comprised of default, specified or random criteria, such as at least one of device location information and client application information comprising at least one of direction, location, unique device identification number or identifier, device serial number, software ID, firmware ID, user name or identifier code, one or more attributes of a user of the device (such as at least one of the user's professional, associational, personal, physical, social, athletic, recreational, hobby and other interests and attributes), or any other data associated with the device or its user.

20. The device of claim 19, wherein the at least one targeted marketing or other promotional message comprises a promotion that is accessible or redeemable through the client application.

* * * * *